United States Patent [19]

Matsuda et al.

[11] Patent Number: 5,247,665
[45] Date of Patent: Sep. 21, 1993

[54] DATA BASE PROCESSING APPARATUS USING RELATIONAL OPERATION PROCESSING

[75] Inventors: Susumu Matsuda, Akishima; Kazuo Togo, Hamura; Takao Iwasaki

[73] Assignee: Kabushiki Kaisha Toshiba, Kawasaki, Japan

[21] Appl. No.: 413,729

[22] Filed: Sep. 28, 1989

[30] Foreign Application Priority Data

| Sep. 30, 1988 | [JP] | Japan | 63-246471 |
| Dec. 27, 1988 | [JP] | Japan | 63-327542 |
| Dec. 28, 1988 | [JP] | Japan | 63-333564 |
| Mar. 30, 1989 | [JP] | Japan | 1-76531 |
| Mar. 30, 1989 | [JP] | Japan | 1-76532 |
| Apr. 11, 1989 | [JP] | Japan | 1-91107 |

[51] Int. Cl.[5] .................................... G06F 9/38
[52] U.S. Cl. ........................ 395/600; 364/DIG. 1; 364/282.1; 364/283.4
[58] Field of Search .................................. 395/600; 364/200 MS File, 900 MS File

[56] References Cited

U.S. PATENT DOCUMENTS

| 4,514,826 | 4/1985 | Iwata et al. | 364/200 |
| 4,543,630 | 9/1985 | Neches | 364/200 |
| 4,644,471 | 2/1987 | Kojima et al. | 364/300 |

Primary Examiner—Gareth D. Shaw
Assistant Examiner—A. Katbab
Attorney, Agent, or Firm—Finnegan, Henderson, Farabow, Garrett & Dunner

[57] ABSTRACT

A relational operation processing unit is supplied with addresses of a main memory at which file data (including a file format, a block length, a record length, and the like) of an operation target file read out from a magnetic disk unit in the main memory, a type of operation for the file, and operation results are stored. A relational operation processing unit extracts key fields of records contained in the operation target file, and adds the addresses of the main memory at which the records having the key fields are stored, as identifiers to respective key data. An operation is performed using a pair of key data and an identifier as a processing unit. The identifiers are extracted from a data string obtained as results of an operation and are written in the main memory. The CPU rearranges the corresponding records in the order of the stored identifiers.

13 Claims, 12 Drawing Sheets

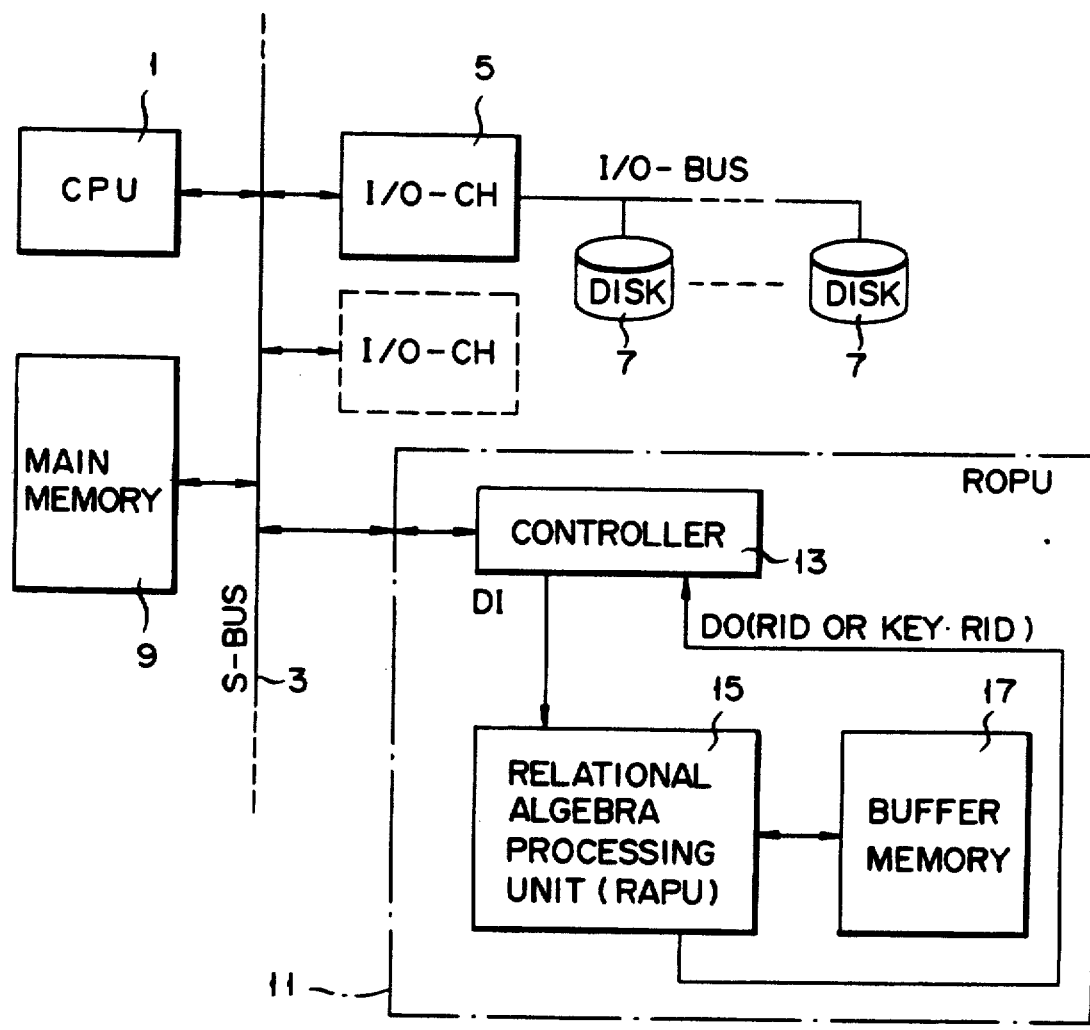
F I G. 6

DATA BASE PROCESSING APPARATUS USING RELATIONAL OPERATION PROCESSING

BACKGROUND OF THE INVENTION

1. Field of the Invention

The present invention relates to a data base processing apparatus suitable for a data processing system which is required to perform complex arithmetic operations including sorting and relational operations (or relational algebra) in a relational data base (RDB) as well as simple selection processing in data base processing.

2. Description of the Related Art

A "selecting apparatus" disclosed in Japanese Patent Application No. 62-24751 is known as a conventional data processing mechanism designed for a data base. According to this selecting apparatus, a CPU, a main memory, and an input/output channel unit are connected to each other through a system bus. In addition, a plurality of magnetic disk units are connected to the input/output channel unit together with the selecting apparatus through a magnetic disk controller. The selecting apparatus comprises a buffer, an extracting unit, a processing unit, and a read unit. The selecting apparatus realizes an efficient data retrieval system for directly receiving data read out from a given magnetic disk unit used as a large-capacity data file and selecting data satisfying given conditions, i.e., so-called on-the-fly processing.

More specifically, a processing target file stored in a given magnetic disk unit is read in the buffer memory of the selecting apparatus. Upon detection of a key field to be compared, the extracting unit extracts data of the key field, adds the start address of the data in the buffer memory to the key field, and outputs the key field to the processing unit. The processing unit compares the input key field with a predetermined criterion. If the key field satisfies the criterion, the processing unit outputs the start address, which is added by the extracting unit, to the read unit. The read unit outputs the corresponding data in the buffer memory onto the system bus on the basis of the input start address data.

This selecting apparatus, however, has the following drawbacks:

i) Processing such as sorting or relational operations cannot be performed with respect to files stored in magnetic disk units connected to different input/output channel units. This is because a selecting apparatus is independently connected to each input/output channel.

ii) Since the capacity of the buffer memory of a selecting apparatus is too small to process one file as a unit, the file must be divided into parts. Hence, processing efficiency is not good.

iii) The above start address data is not held in the buffer memory. Therefore, for example, if one file is divided into two files, and arithmetic operations are respectively performed for the divided files, these two files cannot be merged after the operations.

SUMMARY OF THE INVENTION

It is an object of the present invention to provide a data base processing apparatus which can efficiently execute sophisticated data processing for complex operations such as a sorting operation or a relational operation in an RDB with a simple control operation, and which can efficiently execute sophisticated arithmetic operations even if a target file is dispersed in a plurality of magnetic disk units connected to different input and output channel devices.

According to the first aspect of the present invention, there is provided a data base processing apparatus comprising: external storage means for storing files comprising records having a plurality of data fields each assignable as a key field; main memory means for storing a processing target file of the files stored in the external storage means in a first area; input/output means for reading the processing target file from the external storage means and storing the read file in the main memory means, or writing a processed file stored in the main memory means in the external storage means; a central processing unit (CPU) for outputting address data of a second area of the main memory means which stores an identifier representing address data on the main memory means at which each record constituting the file stored in the main memory means is stored, an operation command for designating an operation for the file, and an operation result; and relational operating means for extracting a key field from each record of the processing target file stored in the first area of the main memory means in response to the operation command supplied from the CPU, adding the identifier to the key field, performing an operation designated by the operation command using an obtained pair of the key field and the identifier as a processing unit, extracting each identifier from a data string obtained as an operation result, and storing the extracted identifiers in the second area of the main memory means, whereby the CPU rearranges the respective records stored in the first area in the order of the identifiers stored in the second area.

According to the second aspect of the present invention, there is provided a data base processing apparatus comprising: external storage means for storing files comprising records having a plurality of data fields each assignable as a key field; main memory means for storing a processing target file of the files stored in the external storage means in a first area; input/output means for reading the processing target file from the external storage means and storing the read file in the main memory means, or writing a processed file stored in the main memory means in the external storage means, the input/output means having local memory means and output file forming means for rearranging the records stored in the first area of the main memory means; a central processing unit (CPU) for outputting address data of a second area of the main memory means which stores an identifier representing address data on the main memory means at which each record constituting the file stored in the main memory means is stored, an operation command for designating an operation for the file, and an operation result; and relational operating means for extracting a key field from each record of the processing target file stored in the first area of the main memory means in response to the operation command supplied from the CPU, adding the identifier to the key field, performing an operation designated by the operation command using an obtained pair of the key field and the identifier as a processing unit, extracting each identifier from a data string obtained as an operation result, and storing the extracted identifiers in the second area of the main memory means, whereby the input/output means rearranges the records, which are stored in the first area, in the local memory means in the order of the identifiers stored in the second area of the main memory means, and writes the rearranged records as an output file in the external storage means.

According to the third aspect of the present invention, there is provided a data base processing apparatus comprising: a host unit; an input/output channel connected to the host unit through a system bus; a disk controller, connected to the input/output channel through a specific bus, for controlling a plurality of disk units; and a data base processing mechanism connected to the host unit through the specific bus, the data base processing mechanism including means for receiving an operation processing command and parameters with respect to a data base including sorting or relational algebra in a relational data base as an operation processing target from the host unit through the input/output channel, obtaining control of the specific bus, and controlling the disk controller to perform operation processing in accordance with the command independently of the host unit, means for storing data of the operation processing result in the disk unit through the disk controller, and means for signaling an end of the operation processing to the host unit.

According to the fourth aspect of the present invention, there is provided a data base processing apparatus comprising: a host unit; an input/output channel connected to the host unit through a system bus; a disk controller, connected to the input/output channel through a specific bus, for controlling a plurality of disk units; and a data base processing mechanism connected in parallel with the disk controller through the specific bus and having a local memory, the data base processing mechanism including means for receiving an operation processing command and parameters with respect to a data base including sorting or an relational algebra in a relational data base as an operation processing target from the host unit through the input/output channel, obtaining control of the specific bus, reading a processing target file from the disk unit through the disk controller, and storing the read file in a first area of the local memory, adding means for extracting a key field to be processed from each record of the processing target file stored in the first area of the local memory, and adding start address data of a record having the key field on the local memory to the key field as an identifier, means for performing an operation based on the operation command using a pair of the key field and the identifier obtained by the adding means as input data, sequentially extracting the identifier from a data string obtained as an operation result, and storing the identifier in a second area of the local memory, rearranging means for rearranging the records stored in the first area in the order of the identifiers stored in the second area of the local memory, means for storing a processed file obtained by the rearranging means in the disk unit, and means for signaling an end of the operation processing to the host unit.

According to the fifth aspect of the present invention, there is provided a data base processing apparatus comprising: external storage means for storing files comprising records having a plurality of data fields each assignable as a key field; main memory means for storing a processing target file of the files stored in the external storage means in a first area; input/output means for reading the processing target file from the external storage means and storing the read file in the main memory means, or writing a processed file stored in the main memory means in the external storage means; a central processing unit (CPU) for outputting designation data of a second area which stores data concerning the file stored in the first area of the main memory means, operation designation data for the file, and an operation result; and relational operating means for extracting a key field from each record of the processing target file stored in the first area of the main memory means in response to the operation command supplied from the CPU, adding the identifier to the key field, performing an operation designated by the operation command using an obtained pair of the key field and the identifier as a processing unit, extracting each identifier from a data string obtained as an operation result, generating a result identifier string or a data string consisting of pairs of identifiers and key fields, and writing the result identifier string or the data string in the second area of the main memory means, whereby when the content stored in the second area is the identifier string, the CPU rearranges the records stored in the first area in the order of the identifiers, and when the content is the data string consisting of pairs of identifiers and key fields, the CPU holds the contents as an intermediate result of operation processing with respect to the file, and rearranges the file stored in the first area of the main memory using the intermediate result.

According to the sixth aspect of the present invention, there is provided a data base processing apparatus comprising: external storage means for storing files comprising records having a plurality of data fields each assignable as a key field; local memory means having a first area in which an operation target file of the files stored in the external storage means is stored; a central processing unit (CPU) for outputting address data of a second area of the local memory means which stores an identifier representing address data on the local memory means at which each record constituting the file stored in the local memory means is stored, an operation command for designating an operation for the file, and an operation result; and relational operating means for extracting a key field from each record of the processing target file stored in the first area of the local memory means in response to the operation command supplied from the CPU, adding the identifier to the key field, performing an operation designated by the operation command using an obtained pair of the key field and the identifier as a processing unit, extracting each identifier from a data string obtained as an operation result, generating a result identifier string or a data string comprising pairs of identifiers and key fields, and writing the result identifier string or the data string in the second area of the local memory means, rearranging the records stored in the first area of the local memory means in the order of the identifiers when the result identifier string is written in the second area, and holding the data string comprising pairs of identifiers and key fields, when the data string is written in the second area, as an intermediate result of operation processing for the file so as to rearrange the file stored in the first area of the local memory area using the intermediate result.

According to the seventh aspect of the present invention, there is provided a data base processing apparatus comprising: external storage means for storing files comprising records having a plurality of data fields each assignable as a key field; main memory means for storing a processing target file of the files stored in the external storage means in a first area; input/output means for reading the processing target file from the external storage means and storing the read file in the main memory means, or writing a processed file stored in the main memory means in the external storage means; a central processing unit (CPU) for outputting designation data of a second area which stores data concerning the file stored in the first area of the main memory means, operation designation data for the file, and an operation result; and relational operating means for extracting a key field from each record of the processing target file stored in the first area of the main memory means in response to the operation command supplied from the CPU, adding the identifier to the key field, performing an operation designated by the operation command using an obtained pair of the key field and the identifier as a processing unit, extracting each identifier from a data string obtained as an operation result, generating a result identifier string, and writing the result identifier string in the second area of the main memory, whereby the CPU rearranges the records stored in the first area in the order of the identifiers stored in the second area, and at the same time in response to projection data for extracting a partial field of each of the records, the CPU extracts key fields designated by the projection data and writes the extracted key fields in the external storage means every time the respective records are rearranged.

According to the eighth aspect of the present invention, there is provided a data base processing apparatus comprising: external storage means for storing files comprising records having a plurality of data fields each assignable as a key field; local memory means having a first area in which an operation target file of the files stored in the external storage means is stored; a central processing unit (CPU) for outputting address data of a second area of the local memory means which stores an identifier representing address data on the local memory means which each record constituting the file stored in the local memory means is stored, an operation command for designating an operation for the file, and an operation result; and relational operating means for extracting a key field from each record of the processing target file stored in the first area of the local memory means in response to the operation command supplied from the CPU, adding the identifier to the key field, performing an operation designated by the operation command using an obtained pair of the key field and the identifier as a processing unit, extracting each identifier from a data string obtained as an operation result, generating a result identifier string or a data string comprising pairs of identifiers and key fields, writing the result identifier string or the data string in the second area of the local memory means, rearranging the records stored in the first area of the local memory means in the order of the identifiers when the result identifier string is written in the second area, at the same time, in response to projection data for extracting a partial field of each of the records, extracting key fields designated by the projection data and writing the key fields in the external storage means every time the respective records are rearranged, and holding the data string comprising pairs of identifiers and key fields, when the data string is written in the second area, as an intermediate result of operation processing for the file so as to rearrange the file stored in the first area of the local memory area using the intermediate result.

According to the ninth aspect of the present invention, there is provided a data base processing apparatus comprising: external storage means for storing files comprising records having a plurality of data fields each assignable as a key field; main memory means for storing a processing target file of the files stored in the external storage means in a first area; input/output means for reading the processing target file from the external storage means and storing the read file in the main memory means, or writing a processed file stored in the main memory means in the external storage means; a central processing unit (CPU) for outputting designation data of a second area which stores data concerning the file stored in the first area of the main memory means, operation designation data for the file, and an operation result; and relational operating means for extracting a key field from each record of the processing target file stored in the first area of the main memory means in response to the operation command supplied from the CPU, adding an identifier as a number or relative position data of each record to the key field, performing an operation designated by the operation command using an obtained pair of the key field and the identifier as a processing unit, extracting each of the identifiers from a data string obtained as the operation result, generating a result identifier string, and writing the identifier string in the second area of the main memory means; means for obtaining a position data string of operation result records on the external storage means from the identifier string stored in the second area of the main memory means and logical data and physical data of the target file, the physical data including external storage addresses; and means for fetching records based on the position data string from the external storage means into a third area of the main memory means by read-access to the external storage means based on the position data string, and storing the records in a predetermined output file storage area of the external storage means in units of predetermined amounts.

According to the tenth aspect of the present invention, there is provided a data base processing apparatus for executing predetermined operation processing for a data base including sorting and relational algebra processing in a relational data base as a processing target with respect to a processing target file located in a single external storage unit or a plurality of external storage units, comprising: means for dividing the processing target file into a plurality of partial elements when a data amount of the processing target file exceeds a data size in which data can be processed at once in main memory means, and fetching the file in a first area of the main memory storage in units of partial elements; means for receiving logical data concerning the file including a block length, a record length, a key position, and a key length, and an operation command including an operation type, extracting a key to be processed from each record of the processing target file stored in the first area of the main memory means in accordance with the logical data, and adding a serial number or relative position data of a record having the key to the key; means for executing processing by the key adding means with respect to the entire processing target file so as to obtain input data comprising a pair of a key and an identifier, executing an operation based on the operation command with respect to a key value of each obtained input data, and storing an identifier string rearranged in the order of operation results in a second area of the main memory means; means for obtaining a position data string of operation result records on an external storage from the identifier string stored in the second area of the main memory means and the logical and physical data of the processing target file; means for determining an input unit of external storage data including one or a plurality of records to be processed from the position data string, and reading data of each input unit from the external storage in the order of the position data string into a third area of the main memory means; means for obtaining a start address of each record of the data located in the third area of the main memory in the order of the result identifier string; mean for extracting the record data from the third area of the main memory means in the order of the address string, and arranging output data in a fourth area of the main memory means in accordance with logical data of a result file; and means for outputting the output data arranged in the fourth area of the main memory means to an output file storage area of a predetermined external storage in accordance with physical data of the result file including external storage addresses.

According to the present invention, sophisticated data processing for complex operations such as sorting or relational algebra in a relational data base can be efficiently executed with a simple control operation. Especially, even if a target file is dispersed in a plurality of magnetic disk units which are independently controlled, sophisticated arithmetic operations can be efficiently executed. In addition, since read operations from disk units and extraction of the key portion can be independently performed, the extraction rate of the key portion is not influenced by the read rate of the disks. With this arrangement, a target file of any file format can be flexibly processed, and hence the function and processing performance can be improved.

In addition, since a file forming function is provided in the input/output channel having an output path for a magnetic disk unit, an operation result need not be written in the main memory, and moreover an operation result need not be transferred from the main memory to the magnetic disk unit. For this reason, the load factors of the CPU and the system bus are reduced, and the processing performance is greatly improved.

BRIEF DESCRIPTION OF THE DRAWINGS

FIG. 6 is a block diagram showing the fourth embodiment of the present invention;

DETAILED DESCRIPTION OF THE PREFERRED EMBODIMENTS

Figure 1:
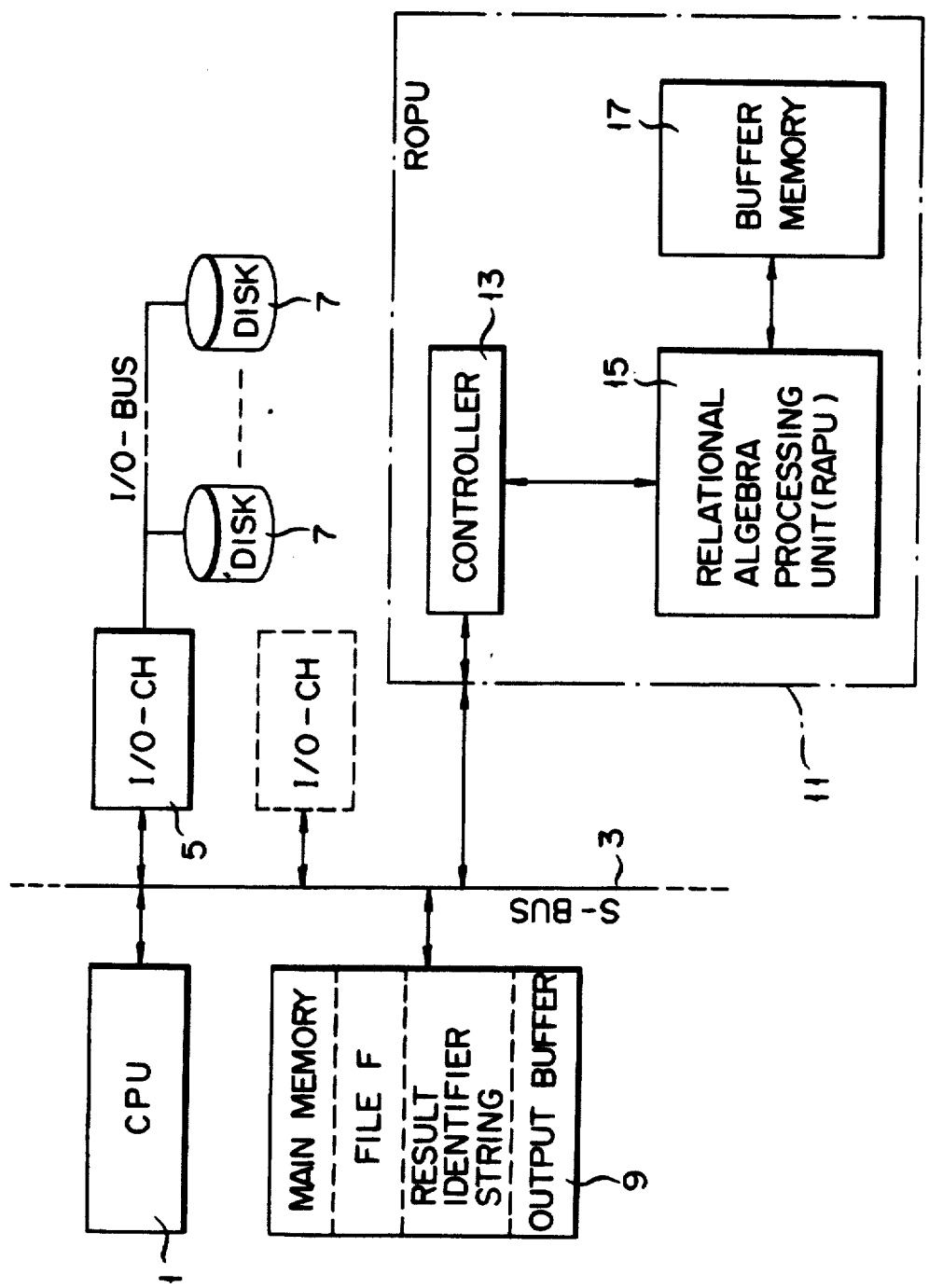
FIG. 1 is a block diagram showing the first embodiment of the present invention.

FIG. 1 is a block diagram showing the first embodiment of the present invention. For the sake of simplicity, FIG. 1 shows an arrangement in which only one I/O channel for controlling magnetic disk units (optical disk units) is arranged on a system bus.

A CPU 1 controls the overall system. More specifically, the CPU 1 controls an input/output (I/O) channel 5, a main memory 9, and a relational operation processing unit (ROPU) 11 connected to a system bus (S-BUS) 3. In data processing for sorting or relational algebra operation in a relational data base, the CPU 1 reads out a target file from a magnetic disk unit 7 connected to the I/O channel 5, and writes the file in a first area of the main memory 9. In addition, the CPU 1 supplies address data of a second area of the main memory 9 to the ROPU 11 to store data concerning the operation target file stored in the first area of the main memory 9 (e.g., a file format, a block length, and a record length), an operation command, and an operation result. In accordance with a data string of the operation result (result identifier string) stored in the second area of the main memory 9, the CPU 1 rearranges the respective records, constituting the operation target file in the first area, in the order of the result identifier string.

The I/O channel 5 is connected to the CPU 1 through the S-BUS 3 and accesses a plurality of magnetic disk units 7 under the control of the CPU 1.

Data groups having various file structures constituting a data base are stored in the magnetic disk units 7.

The main memory 9 is connected to the S-BUS 3 and has the first area for storing an operation target file F, and the second area for storing various data such as data concerning the target file F (e.g., a file format, a block length, and a record length), an operation command, and an operation result (result identifier string).

The ROPU 11 extracts a key field $K_i$ ($i = 1, \ldots, n$) as a processing target from each record of the processing target file F, and adds start position data (e.g., an address of the main memory or a record number) of the record having the key in the main memory 9 to the key field $K_i$ ($i = 1, \ldots, n$) as an identifier $A_i$ ($i = 1, \ldots, n$) in accordance with data concerning the processing target file (stored in the first area of the main memory 9) and the operation command stored in the second area of the main memory 9. In addition, the ROPU 11 executes an arithmetic operation designated by the operation command with respect to the key data of input data DI constituted by a pair of the key field $K_i$ and the identifier $A_i$. Furthermore, the ROPU 11 sequentially extracts identifiers $A_i$ from a data string obtained as an operation result, and stores them in the second area of the main memory 9. The ROPU 11 comprises a controller 13, a relational algebra processing unit (RAPU) 15, and a buffer memory 17. The controller 13 is constituted by a microprocessor in this embodiment.

For example, a 32-bit microprocessor 68020 available from MOTOROLA INC., U.S.A., may be used as this microprocessor. The RAPU 15 is constituted by hardwired logic (e.g., a gate array).

In accordance with data concerning a target file and an operation command stored in the second area of the main memory 9, the controller 13 extracts a processing target key field $K_i$ from each record of the processing target file stored in the first area of the main memory 9, and adds the start location data (on the main memory 9) of a record having the key field to the key field Ki as an identifier Ai. In this embodiment, since each record comprises a plurality of key fields, and each record length and each key field length are constant, the start location data (on the main memory 9) of each record can be obtained by multiplying the record length by the number of records. In addition, the controller 13 stores output data DO, supplied from the RAPU 15, in the second area of the main memory 9. The RAPU 15 receives a pair of a key field Ki and an identifier Ai from the controller 13 as input data DI, performs an arithmetic operation designated by an operation command with respect to the key field of this input data by using the buffer memory 17, and stores the operation result in the buffer memory 17. The RAPU 15 performs, as a relational operation, for example, "selection" (extracting a record satisfying the value of a specific key from a given file), "projection" (forming a record using only designated keys), "join" (when attribute data is to be added to a given file, and it is required that another file is formed to be merged with the given file without increasing the file length of the given file, the two files are joined together), or "max/min/sum" (selecting maximum- and minimum-value records concerning a given key from a file or obtaining the sum of specific keys of the respective records). The RAPU 15 sequentially extracts identifiers Ai from each data string in the buffer memory 17 obtained as an operation result, and outputs the identifiers as output data DO to the controller 13. The controller 13 stores the output data DO in the second area of the main memory 9.

Figure 2:
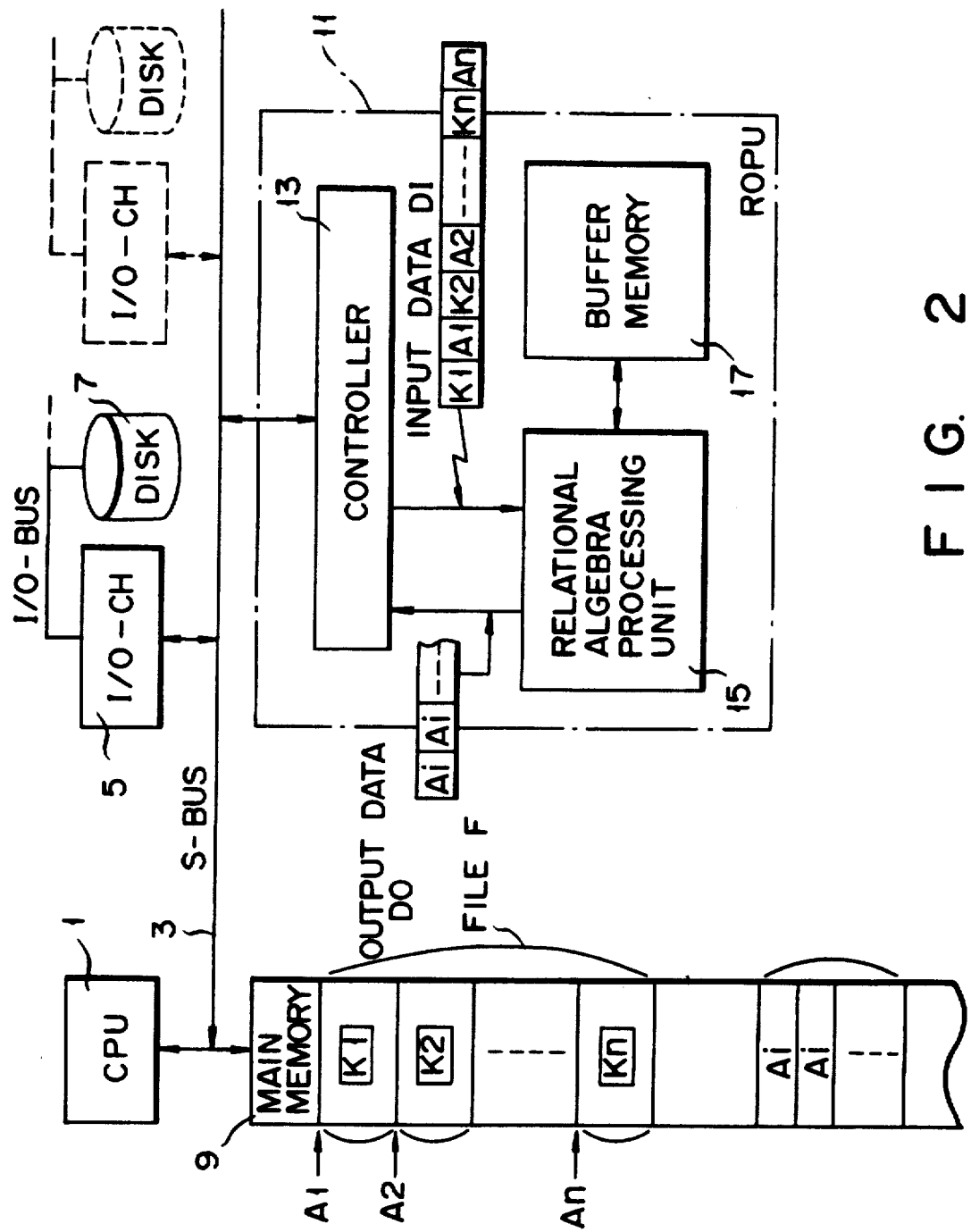
FIG. 2 is a schematic view for explaining an operation of the first embodiment in FIG. 1.

An operation of the first embodiment will be described below with reference to FIGS. 1 and 2.

Upon reception of an operation command for sorting (ascending order/descending order) or a relational operation from an input mechanism on a terminal side (not shown), the CPU 1 reads a processing target file from one of the magnetic disk units 7 through the S-BUS 3 and the I/O channel 5, and writes the file in the first area of the main memory 9. In this case, if the processing target file is dispersed in a plurality of magnetic disk units 7, the CPU 1 commands a corresponding I/O channel 5 to access the corresponding magnetic disk units 7, and stores the target file in the first area of the main memory 9. Subsequently, the CPU 1 supplies address data of the second area to the ROPU 11 so as to store file data (e.g., a file format, a block length, and a record length) of the target file stored in the first area, a type of operation to be performed for the processing target file, and an operation result. At the same time, the CPU 1 supplies a start signal to the ROPU 11.

In response to the start signal from the CPU 1, the ROPU 11 sets up an operation mode of the RAPU 15, and executes sorting or relational algebra operation in a relational data base. More specifically, the controller 13 in the ROPU 11 extracts a key field Ki from each record of the processing target file stored in the first area of the main memory 9, adds the start location data (on the main memory 9) of the record in which the extracted key is stored to the key field Ki to for input data DI, and outputs the data DI to the RAPU 15. At this time, the controller 13 adds a flag indicating that the data is a key field Ki or an identifier Ai to the output data in synchronism with data output to the RAPU 15.

Figure 3:
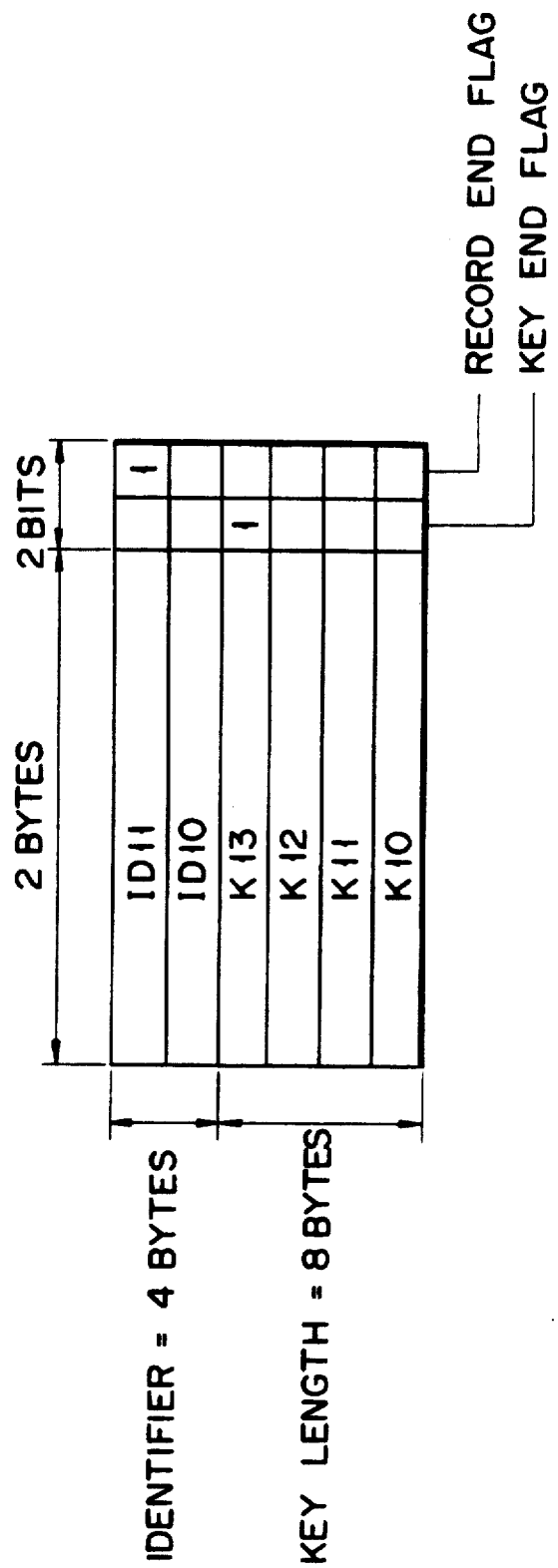
FIG. 3 shows a data format of a key end flag and a record end flag added to a pair of a key field and an identifier.

More specifically, as shown in FIG. 3, a key length and an identifier length are respectively 8 and 4 bytes and are supplied from the main memory 9 to the controller 13 in units of 2 bytes. Upon reception of key fields (K10 through K13) of 8 bytes, the controller 13 sets a key end flag "1" at a corresponding location of a flag field. Upon reception of identifiers of 4 bytes, the controller 13 sets a record end flag "1" at a corresponding location of a flag field.

The RAPU 15 receives the input data DI, performs an arithmetic operation designated by an operation command from the CPU 1 under the control of the controller 13, and stores the operation result in the buffer memory 17. In addition, the RAPU 15 extracts, identifiers A1, A2, ... from a data string obtained as the operation result to form output data DO, and supplies the data DO to the controller 13.

The controller 13 stores the output data DO supplied from the RAPU 15 in the second area of the main memory 9, and signals an operation end to the CPU 1.

In response to the operation end signal from the controller 13, the CPU 1 rearranges the respective records of the file in the first area in the order of the result identifiers stored in the second area, and stores the rearranged records in the magnetic disk unit 7 through the I/O channel 5.

If the size of a processing target file stored in the first area of the main memory exceeds the capacity of the buffer memory, the file is divided into parts using the capacity of the buffer memory 17 as a processing unit. Later, merge processing is performed to obtain a final processing result. If the size of a processing target file exceeds the first area of the main memory, processing is performed using a record No. as an identifier (sorting is performed with respect to pairs of key fields and record Nos.) This processing will be described in detail later.

The second embodiment of the present invention will be described below with reference to FIG. 4.

In the second embodiment, a file forming function of forming an output file from an operation result is provided to an I/O channel 19 arranged between a CPU 1 and magnetic disk units 7. In this embodiment, no operation result is written in a main memory 9, and no output file is transferred from the main memory 9 to the magnetic disk units 7. Therefore, the processing time can be shortened, the load factor of a system bus can be reduced, and the processing performance can be improved.

Figure 4:
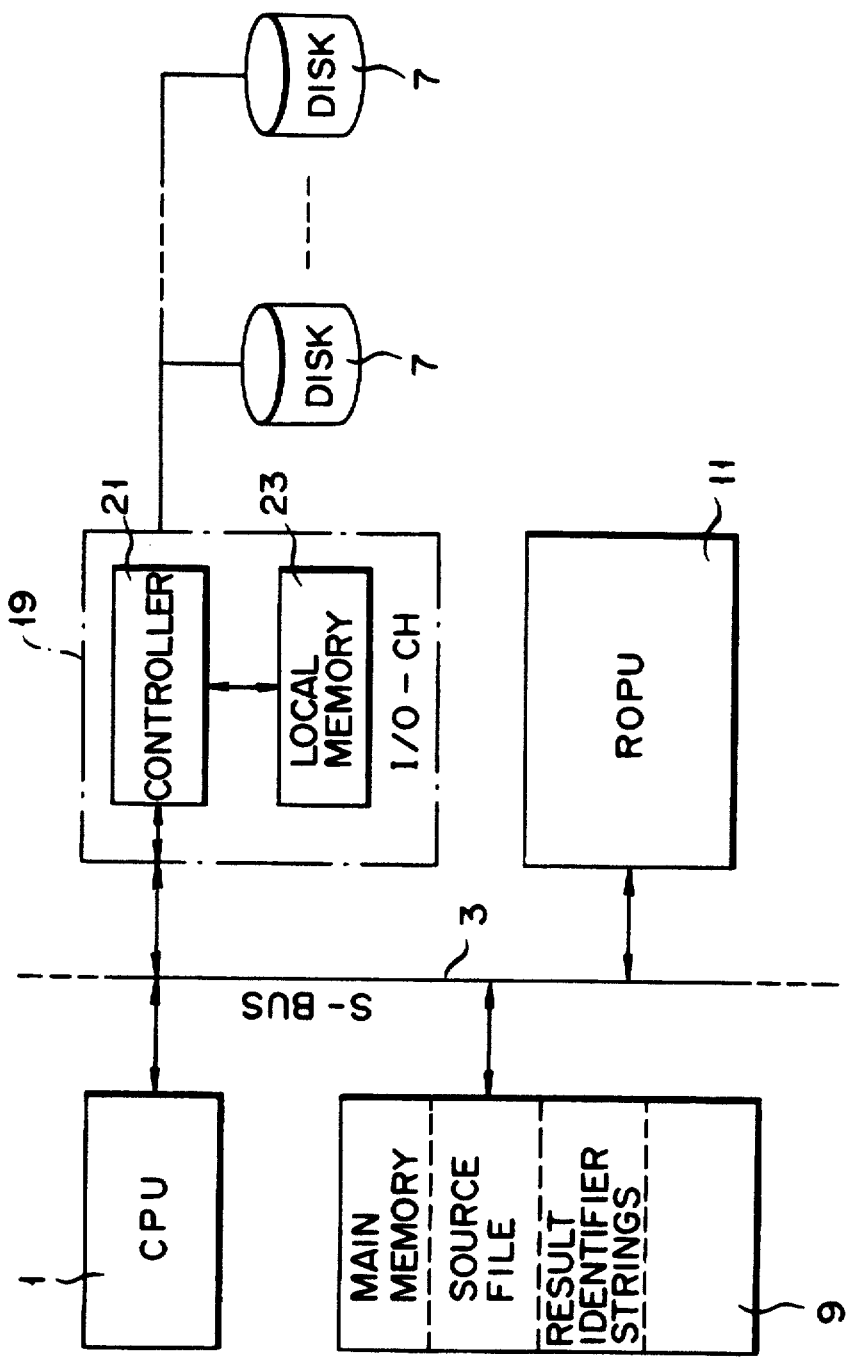
FIG. 4 is a block diagram showing the second embodiment of the present invention.

The same reference numerals in FIG. 4 denote the same parts as in FIG. 1, and a description thereof will be omitted. The I/O channel 19 includes a controller 21 and a local memory 23. The controller 21 is constituted by, e.g., a 32-bit microprocessor 68020 available from MOTOROLA INC., U.S.A., and receives parameters from the CPU 1. The parameters include: data representing the position of a result identifier string stored in the second area of the main memory 9 (addresses in the second area of the main memory 9); logical data concerning a processing target file stored in the first area of the main memory 9 (file data such as a file format, a block length, and a record length); logical data concerning an output file (a file format, a block length, a record length, and the like); and physical data representing the storage location of an output file (output file data such as a location on a disk and size).

In accordance with these parameters, the controller 21 rearranges the respective records constituting the operation target file stored in the first area of the main memory 9 in the local memory 23 in the order of the result identifier string stored in the second area, thus forming an output file.

An operation of the second embodiment will be described in detail below with reference to FIG. 4.

When the CPU 1 recognizes that a result identifier string for an operation target file is stored in the second area of the main memory 9 by the ROPU 11, the CPU 1 supplies the following parameters to the controller 21 of the I/O channel 19: address data of the second area in which the result identifier string is stored, logical data concerning the operation target file (a file format, a block length, a record length, and the like), logical data concerning an output file (a file format, a block length, a record length, and the like), and physical data (output file data such as a location on a disk and a size).

Upon reception of the above-described parameters from the CPU 1, the controller 21 of the I/O channel 19 reads out the records of the file stored in the first area of the main memory in the order of the result identifier string stored in the second area, and rearranges them in the local memory 23. When the amount of record data in the local memory 23 exceeds a unit amount to be written in a magnetic disk unit, the data is written in one of the magnetic disk units 7 in accordance with the physical data concerning an output file. The controller 21 repeatedly executes the above-described operation for all the data of the result identifier string in accordance with the location data of the result identifier string supplied from the CPU 1.

Figure 5:
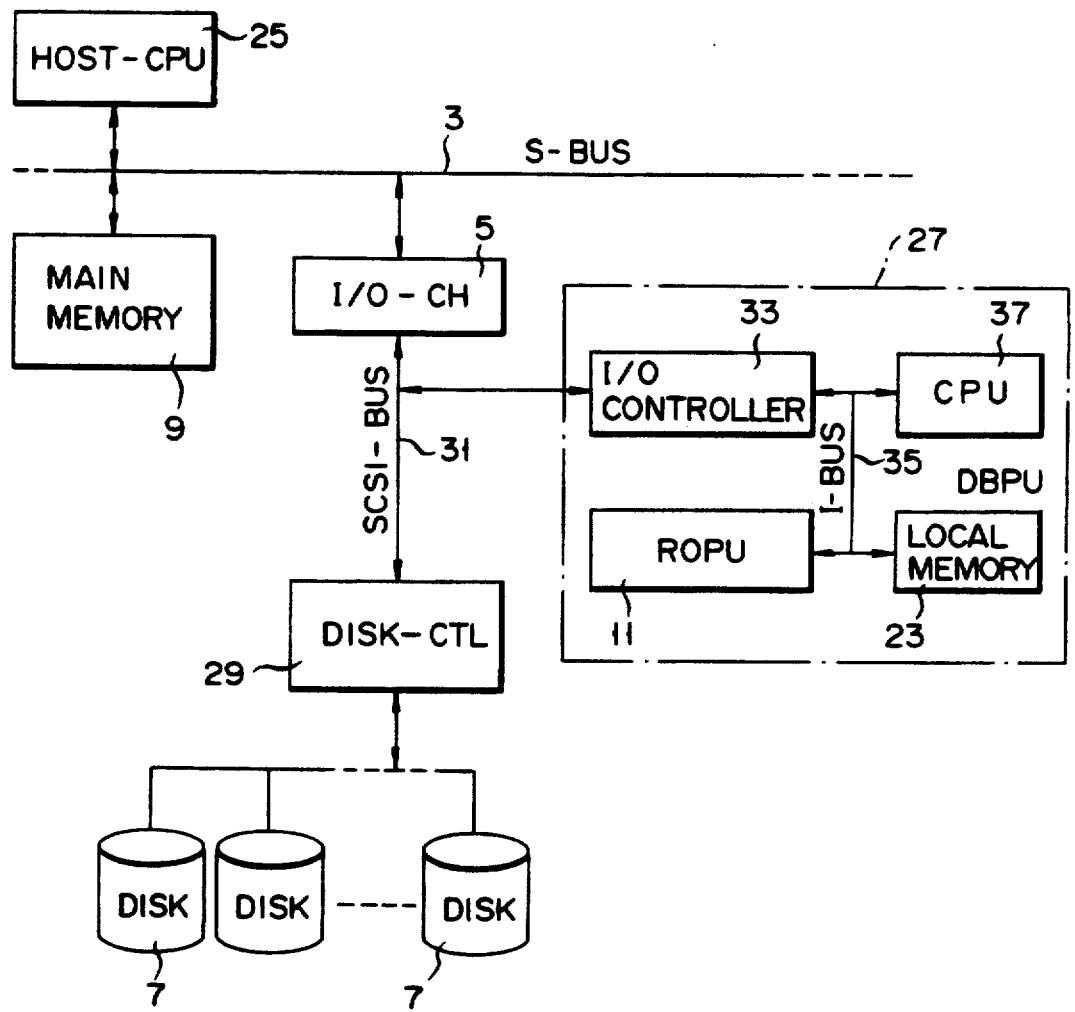
FIG. 5 is a block diagram showing the third embodiment of the present invention.

FIG. 5 is a block diagram showing the third embodiment of the present invention. A host CPU 25 ranks above the CPUs 1 shown in FIGS. 1, 2, and 4. For example, a computer V7050 available from TOSHIBA CORP. can be used as the host CPU 25. In this embodiment, the host CPU 25 supplies operation designation data and corresponding operation parameters to a data base processing unit (DBPU) 27 (to be described later) in data processing for sorting or relational algebra operation or the like in a relational data base. A main memory 9 stores channel programs to be executed by a disk controller 29, the DBPU 27, and an I/O channel 5 (to be described later). The I/O channel 5 controls data transfer between the disk controller 29, the DBPU 27, and the main memory 9. In response to a command from the I/O channel 5, the disk controller 29 controls data transfer between the magnetic disk units 7 and the I/O channel 5. Each magnetic disk unit 7 stores an operation target file under the control of the disk controller 29. A device interface for supporting a multihost system, e.g., an SCSI-BUS 31 connects the I/O channel 5 to the disk controller 29 and the DBPU 27.

The DBPU 27 receives a command of sorting or an arithmetic operation in a relational data base and corresponding parameters from the host CPU 25 through the I/O channel 5, and obtains control of the SCSI bus 31. The DBPU 27 executes operation processing and writes the operation processing result in one of the magnetic disks 7 under the control of the disk controller 29. Upon completion of the designated operation processing, the DBPU 27 signals an operation end to the host CPU 25.

The DBPU 27 comprises an I/O controller 33, a CPU 37, a relational operation processing unit (ROPU) 11, a local memory 23, and an internal bus 35. The I/O controller 33 controls input/output of data with respect to the SCSI bus 31 under the control of the CPU 37. The CPU 37 corresponds to the CPUs 1 shown in FIGS. 1, 2, and 4, and is constituted by, e.g., a 32-bit microprocessor 68020 available from MOTOROLA INC., U.S.A. The CPU 37 communicates with the host CPU 25 and controls the I/O controller 33 and the ROPU 11 executes an operation designated by the host CPU 25.

An operation of the third embodiment will be described below. In data processing for, e.g., sorting or a relational operation, the host CPU 25 supplies an operation command and operation parameters to the DBPU 27 through a system bus 3, the I/O channel 5, and the SCSI bus 31. The operation parameters include logical and physical data of a processing target file and logical and physical data of an output file. The logical data of each of the processing target file and the output file include a file format, a block length, a record length, the respective key field positions and lengths of a multi-key field. The physical data of each of the processing target file and the output file includes the device number of a magnetic disk unit (if a plurality of disk controllers are used, the device number of a corresponding disk controller is included), a disk address, and a disk size.

When the CPU 37 in the DBPU 27 receives the operation command and the operation parameters concerning sorting or relational algebra operation from the CPU 25 through the I/O channel 5, the SCSI bus 31, and the I/O controller 33, the CPU 37 obtains control of the SCSI bus 31, reads the processing target file from a corresponding magnetic disk unit 7, and stores the file in the first area of the local memory 23. The CPU 37 then outputs an operation command to the ROPU 11 and extracts a processing target key field from each record of the processing target file stored in the first area of the local memory 23. In addition, the CPU 37 adds the start location data (on the local memory 23) of the record having the extracted key field to the extracted key field as an identifier, and supplies it to the ROPU 11.

Upon reception of the input data comprising the pair of the key field and the identifier from the CPU 37, the ROPU 11 executes the arithmetic operation for the key field using the working area of the local memory 23. The ROPU 11 sequentially extracts the identifier from each data string obtained as an operation result, and stores it in the second area of the local memory 23. When arithmetic operations are performed for the entire target file stored in the first area of the local memory 23, and the result identifier string is stored in the second area of the local memory 23, the CPU 37 sequentially rearranges the records constituting the processing target file stored in the first area in the order of the result identifier string stored in the second area to form an output file. The CPU 37 stores the file in the magnetic disk unit 7 through the I/O controller 33. Thereafter, the CPU 37 signals a processing end to the host CPU 25 through the I/O controller 33.

In the third embodiment, the DBPU 27 is connected to the SCSI bus 31. However, even if an additional processor for executing operation processing for a data base under the control of the CPU 25 and supplying only the data of the operation result to the CPU 25 is connected to the SCSI bus 31, the load on the host CPU 25 in data base processing can be reduced, and the overall processing performance of the system can be improved. The present invention is not limited to the SCSI bus 31, but any bus may be used as long as it can define a plurality of masters.

FIG. 6 is a block diagram showing the fourth embodiment of the present invention.

In this embodiment, when an operation target file can be stored in the first area of a main memory 9, but the amount of data to be processed exceeds the processing capacity of an RAPU 15, a result identifier (RID) and a key field (KEY) are paired to obtain a data string (KEY·RID) as an intermediate result data for merge processing instead of an operation result identifier string, and merge processing is performed by using the obtained data string. Whether the amount of data to be processed exceeds the processing capacity of the RAPU 15 is determined by a comparison between the number of sort cells which can be actually used with the number of records of a file. The number of sort cells which can be actually used is determined by the record length of a file. The same reference numerals in the fourth embodiment denote the same parts as in FIG. 1, and a description thereof will be omitted.

Of the components constituting an ROPU 11, a controller 13 extracts a key field to be processed from each record of a processing target file F stored in the first area of the main memory 9 in accordance with data concerning the processing file and an operation command. The controller 13 then adds the start location data (on the main memory 9) of the record having the key field to the key field as an identifier, and supplies the data comprising the key field and the identifier a input data DI to the RAPU 15. In addition to the input data DI, the controller 13 generates key end flag data KEF representing a key end (KE) for discriminating a key field from an identifier and record end flag data REF representing a record end (RE), and supplies them to the RAPU 15.

The controller 13 receives an output data (DO) constituted by a result identifier string (RID) or an output data (DO) constituted by a data string (KEY·RID) as an intermediate result consisting of a pair of an identifier and a key, and stores it in the second area of the main memory 9.

Figure 7:
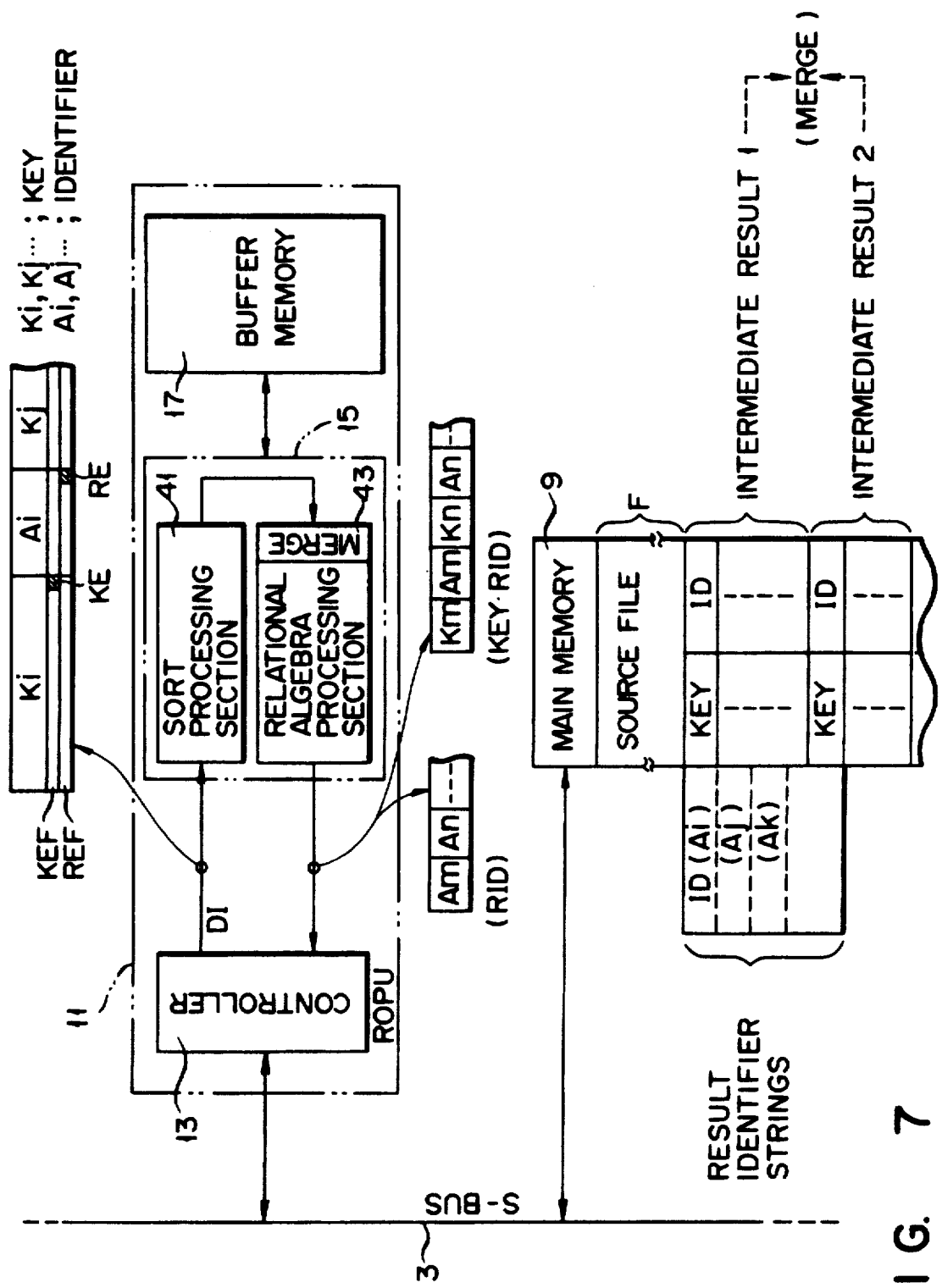
FIG. 7 is a schematic view for explaining an operation of the fourth embodiment in FIG. 6.

As shown in FIG. 7, the RAPU 15 includes a sort processing section 41 and a relational algebra processing section 43, and executes an arithmetic operation for the key value of the input data DI comprising the key and identifier supplied from the controller 13 through a buffer memory 17. The RAPU 15 outputs, as output data (DO), a result identifier string (RID) or a data string (KEY·RID) comprising a pair of an identifier and a key obtained by the arithmetic operation as an intermediate result to the controller 13. The controller 13 stores the output data (DO) in the second area of the main memory 9.

Figure 8:
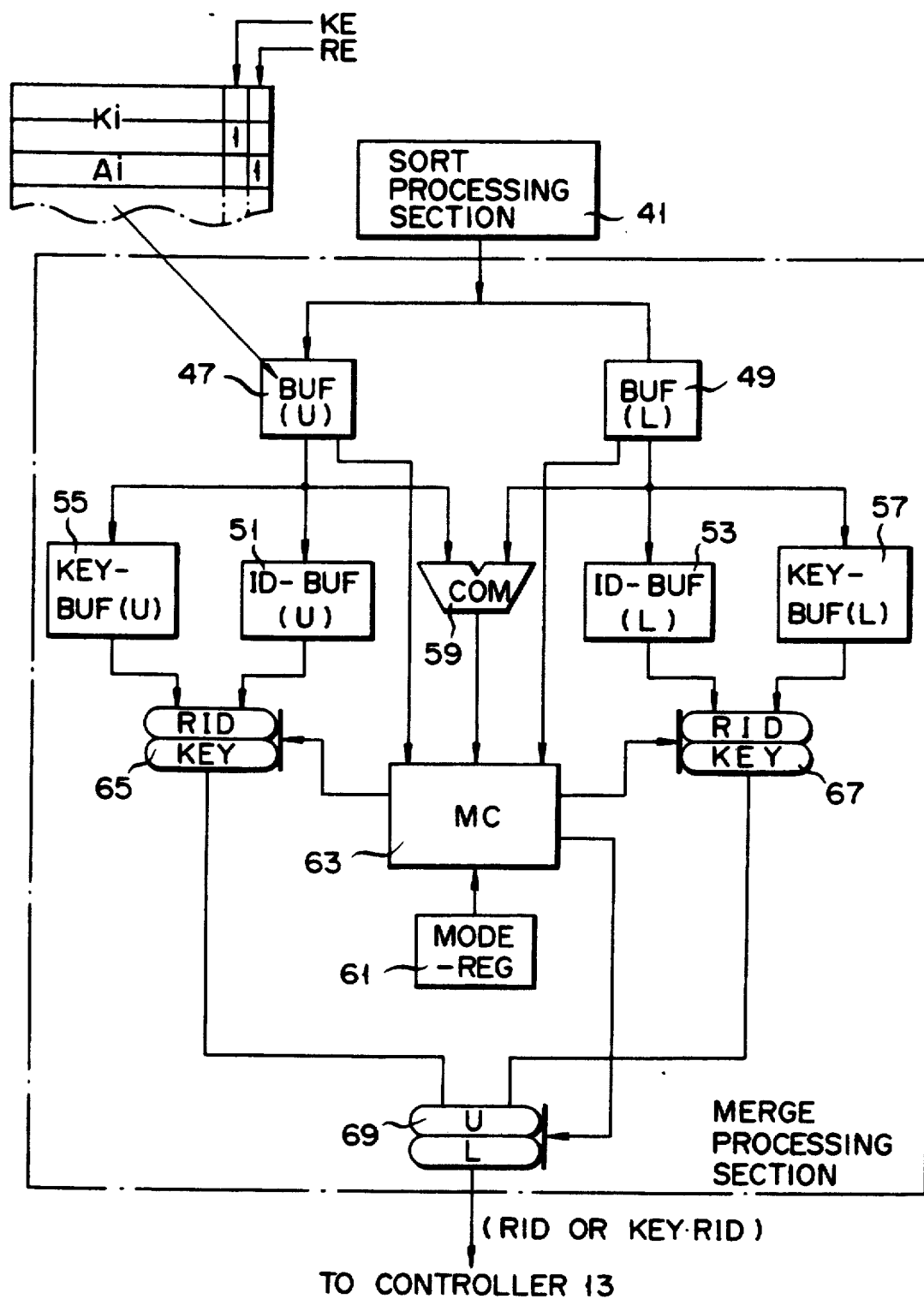
FIG. 8 is a block diagram showing a detailed arrangement of a relational operation processing section shown in FIG. 6.

FIG. 8 shows a detailed arrangement of a selection control mechanism for selectively outputting, as output data (DO), a result identifier string (RID) or a data string (KEY·RID) comprising a pair of an identifier and a key field as an intermediate result.

This selection control mechanism is arranged in a merge processing section 43 in an operational algebra processing unit 15 which is arranged in the ROPU 11.

Referring to FIG. 8, a buffer pair holds merge target data processed by the sort processing section 41 in units of predetermined capacities. This buffer pair is arranged in the buffer memory 17 shown in FIG. 7. A buffer (BUF(U)) 47 holds a condition side file (condition relation). A buffer (BUF(L)) 49 holds a target side file (target relation). In addition to key field and identifier data, each of the buffers 47 and 49 stores key end flag data KEF and record end flag REF for dividing these data in correspondence with each key field Ki and identifier Ai.

An identifier holding section (ID-BUF(U)) 51 holds an identifier output from the BUF(U) 47. An identifier holding section (ID-BUF(L)) 53 holds an identifier output from the BUF(L) 49. A key field holding section (KEY-BUF(U)) 55 holds a key field output from the BUF(U) 47. A key holding section (KEY-BUF(L)) 57 holds a key field output from the BUF(L) 49. A comparator 59 compares key fields respectively output from the BUF(U) and BUF(L) 47 and 49. A mode register 61 holds a type of operation, a type of output, mode data of an operation to be executed, and the like. A merge processing control section (MC) 63 receives comparison result data from the comparator 59, data representing a type of operation set in the mode register 61, and key end flag data KEF and record end flag data REF which are output in synchronism with output of a key field/identifier from the buffers 47 and 49. The MC 63 controls selectors 65, 67, and 69 (to be described later) and outputs a result identifier string (RID) or a data string (KEY·RID) comprising a pair of an identifier and a key field.

The selector 65 selects an identifier held in the ID-BUF(U) 51 or a key field held in the KEY-BUF 55 under the control of the MC 63. Similarly, the selector 67 selects an identifier held in the ID-BUF(L) 53 or a key field held in the KEY-BUF(L) 57 under the control of the MC 63. The selector 69 selects an identifier or data consisting of a pair of an identifier and a key field output from the selectors 65 and 67 under the control o the MC 63, and outputs it as a result identifier string (RID) or a data string (KEY·RID) to the controller 13.

An operation of the fourth embodiment will be described below with reference to FIGS. 6, 7, and 8.

Upon reception of a processing target such as sorting or relational algebra operation and an operation command from an input mechanism on a terminal side (not shown) through a system bus 3, the CPU 1 reads out a processing target file from a magnetic disk unit 7 through the system bus 3 and an I/O channel 5, and writes the file in a predetermined first area on the main memory 9. In this case, if the processing target file is dispersed in a plurality of magnetic disk units, the CPU 1 selectively designates an I/O channel 5 and outputs access commands thereto to store the records of the read out processing target file in the first area of the main memory 9.

Subsequently, the CPU 1 supplies the following data to the ROPU 11: data concerning the processing target file stored in the main memory (file data including a file format, a block length, a record length, and the like); operation designation data for the file; an operation result (KEY·RID) including an intermediate result; and address data in the main memory 9 at which a result identifier string (RID) of an operation result requiring no merge processing is stored. At the same time, the CPU 1 supplies a start command to the ROPU 11.

Upon reception of the aboved-described data from the CPU 1, the ROPU 11 sets an operation mode of the RAPU 15 and performs sorting or relational algebra processing in a relation data base in response to the start command. More specifically, the controller 13 in the ROPU 11 extracts a designated key field from each of the records constituting the processing target file stored in the first area of the main memory 9, and adds the location data (on the main memory 9) of the key field to the key field so as to generate input data (DI) comprising a pair of the extracted key field and an identifier. The CPU 1 outputs this input data (DI) to the RAPU 15 together with key end flag data KEF and record end flag data REF. Upon reception of the input data DI, the RAPU 15 performs an operation (selection, join, max/-min/sum, or the like) for each extracted key field in accordance with an operation command from the CPU 1 under the control of the controller 13. In response to an output command from the CPU 1, the RAPU 15 sequentially extracts identifiers from a data string obtained as an operation result to generate a result identifier string (RID) or a data string (KEY·RID) comprising pairs of identifiers and key fields. The result identifier string (RID) or the data string (KEY·RID) is output as output data DO to the controller 13.

When the amount of data to be processed exceeds the processing capacity of the controller 13, sorting of data (processing requiring a merge operation) must be performed in an external unit using an operation result as an intermediate result. In this case, if key fields are extracted from a result identifier string (RID) again, overheads are increased, resulting in degradation in performance.

In this embodiment, if the amount of data to be processed exceeds the processing of the RAPU 15, and an intermediate result is required, operation data including an output command, for outputting a data string consisting of pairs of identifiers and key fields, is set in the mode register 61 to obtain a data string (KEY·RID) comprising pairs of identifiers and keys as an intermediate result instead of a result identifier string.

A selection control operation of a result identifier string (RID) or a data string (KEY·RID) comprising pairs of identifiers and key fields used for merge processing in the RAPU will be described below with reference to FIG. 8.

In execution of merge processing, merge processing target data output from the sort processing section 41 are stored in the BUF(U) 47 and the BUF(L) 49 in units of predetermined amounts, and are read out as operation targets in units of pairs under the control of the MC 63. Of each pair of data read out from the BUF(U) 47 and the BUF(L) 49, corresponding identifiers are respectively stored in the the ID-BUF(U) 51 and the ID-BUF(L) 53, and corresponding key fields are respectively stored in the KEY-BUF(U) 55 and the KEY-BUF(L) 57.

When output designation data for outputting a data string (KEY·RID) to obtain an intermediate result is set in the mode register 61, the MC 63 selects and outputs a data string (KEY·RID) comprising pairs of identifiers Am and key fields Km belonging to one group on the basis of a comparison operation result output from the comparator 59 and the contents of the operation designation data. In this case, the MC 63 controls the respective selectors 65, 67, and 69 so as to output the key fields Km and the identifiers Am by using key end flags and record end flags.

In contrast to this, when output designation data for outputting a result identifier string (RID) requiring no intermediate result is set in the mode register 61, each identifier Am belonging to one group is output from the selector 69 at the timing of a record end flag (RE).

In merge processing, when data stored in, e.g., the BUF(U) 47 is selected and output, the pointer of the BUF(U) 47 is incremented, and the next data is designated by the pointer. However, the pointer of the BUF(L) 49 is not incremented, and and the same data is read again at the time of the next data comparison.

In this manner, a result identifier string (RID) or a data string (KEY·RID) comprising pairs of identifiers and keys is selectively output as output data (DO) from the RAPU 15 and is supplied to the controller 13.

The controller 13 stores the output data (DO) supplied from the RAPU 15 in the second area of the main memory 9. When operations of all the identifiers extracted from the processing target file F are completed, the controller 13 signals the end of the operations to the CPU 1.

When the CPU 1 receives the operation end signal from the controller 13 and the operation result is an intermediate result, it executes merge processing (external sorting) again by using the data string (KEY·RID) stored in the second area of the main memory 9 as it is. This operation precludes an operation of extracting a key field from each identifier, and hence the processing speed can be increased by a time of that operation.

If the operation result is not an intermediate result, the CPU 1 rearranges the records of the target file F stored in the first area of the main memory 9 in accordance with the result identifier string (RID) stored in the second area of the main memory 9 to form a new file as an output file based on the designated operation result. Thereafter, the CPU 1 stores the output file in the magnetic disk unit 7 through the I/O channel 5.

Especially when a target file is dispersed in a plurality of independently controlled magnetic disk units, sophisticated operation processing can be efficiently executed. In addition, when an intermediate result requiring merge processing is to be output, a data string (KEY·RID) comprising pairs of identifiers and keys is output instead of an identifier string (RID). Therefore, in merge processing, an operation of extracting key values again on the basis an identifier string is not necessary, and merge processing can be efficiently executed at high speed.

In the above embodiment, when an operation result requiring no merge processing is to be obtained, the CPU 1 rearranges the records of the target file F stored in the first area of the main memory 9 in the order of the operation result (result identifier string) stored in the second area in response to the operation end signal from the controller 13, thus forming a new file based on the designated operation result. Thereafter, the CPU 1 writes the new file (output file) data in the magnetic disk unit 7 through the I/O channel 5. If this processing function is provided to the ROPU 11, the load of the CPU 1 can be reduced.

In addition, if a file forming function is provided to the I/O channel 5 having an output path to an external storage for storing a file, writing processing of an operation result in the main memory and transfer processing of operation result data from the main memory to an external storage can be omitted. Hence, the processing time can be shortened, and the load factor of the system bus can be reduced.

In the above-described embodiment, start location data (a main memory address) of a record having a designated key in the main memory is added to the corresponding key field as an identifier. However, a record number may be added instead of a main memory address. Furthermore, as shown in the embodiment described with refence to FIG. 5, a bus connection may be designed to allow the DBPU 27 to directly access a magnetic disk unit under the control of the CPU, so that a processing target file is stored in the local memory, and the start location data of a record having a designated key field in the local memory may be added to the corresponding key as an identifier.

Moreover, in the above embodiment, the KEY-BUF(U) 55 and the KEY-BUF(L) 57, and the ID-BUF(U) 51 and ID-BUF(L) 53 are independently arranged on the target and condition relation sides, respectively. However, these components may be commonly used on both the target and condition relation sides. Alternatively, the above buffers 51, 53, 55, and 57 may be omitted by directly using data read out from the buffers and properly setting control timings.

Figure 9:
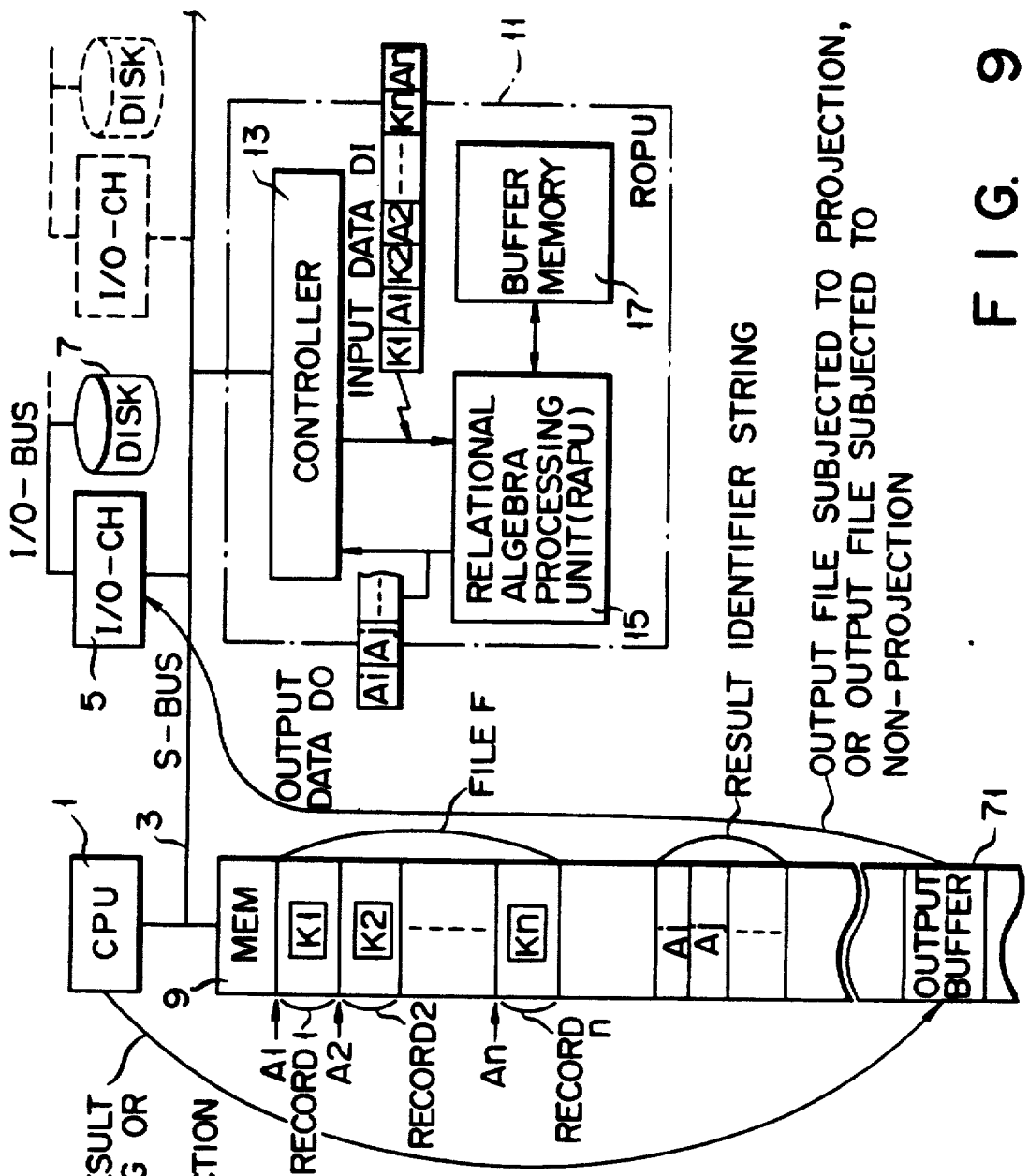
FIGS. 9 and 10 are schematic views for explaining an operation of the fifth embodiment of the present invention.

The fifth embodiment of the present invention will be described below with reference to FIGS. 9 and 10.

This embodiment comprises a means for extracting fields designated by projection data. More specifically, in rearrangement based on a result identifier string, when projection data for extracting some fields (attributes) from the records of a file is set, fields designated by the projection data are extracted from the records to be rearranged which are designated by a result identifier string, as shown in FIG. 10. In this embodiment, projection processing means formation of a new record by extraction of only designated attributes from n attributes constituting a record.

In this case, projection data includes data representing the number of fields to be extracted and data representing the position and length of each field to be extracted. However, in addition to these data, the projection data may include data (length, position, and the like) of a field to be inserted.

A main memory 9 has a third area as an output buffer for holding output file data obtained by rearranging a file or output file data obtained by extracting key fields in accordance with projection data in the above rearrangement processing.

Upon reception of an operation end signal from a controller 13, a CPU 1 rearranges the records of a target file F stored in the first area of the main memory 9 in the order of an operation result (result identifier string) stored in the second area of the main memory 9 to form a new output file in an output buffer 71 of the main memory 9, and stores the output file in a magnetic disk unit 7 through an I/O channel 5. In this case, if the size of the processing target file exceeds the work area of the main memory 9, the file is processed in units of work sizes, and merge processing is finally performed to obtain a processing result.

Figure 10:
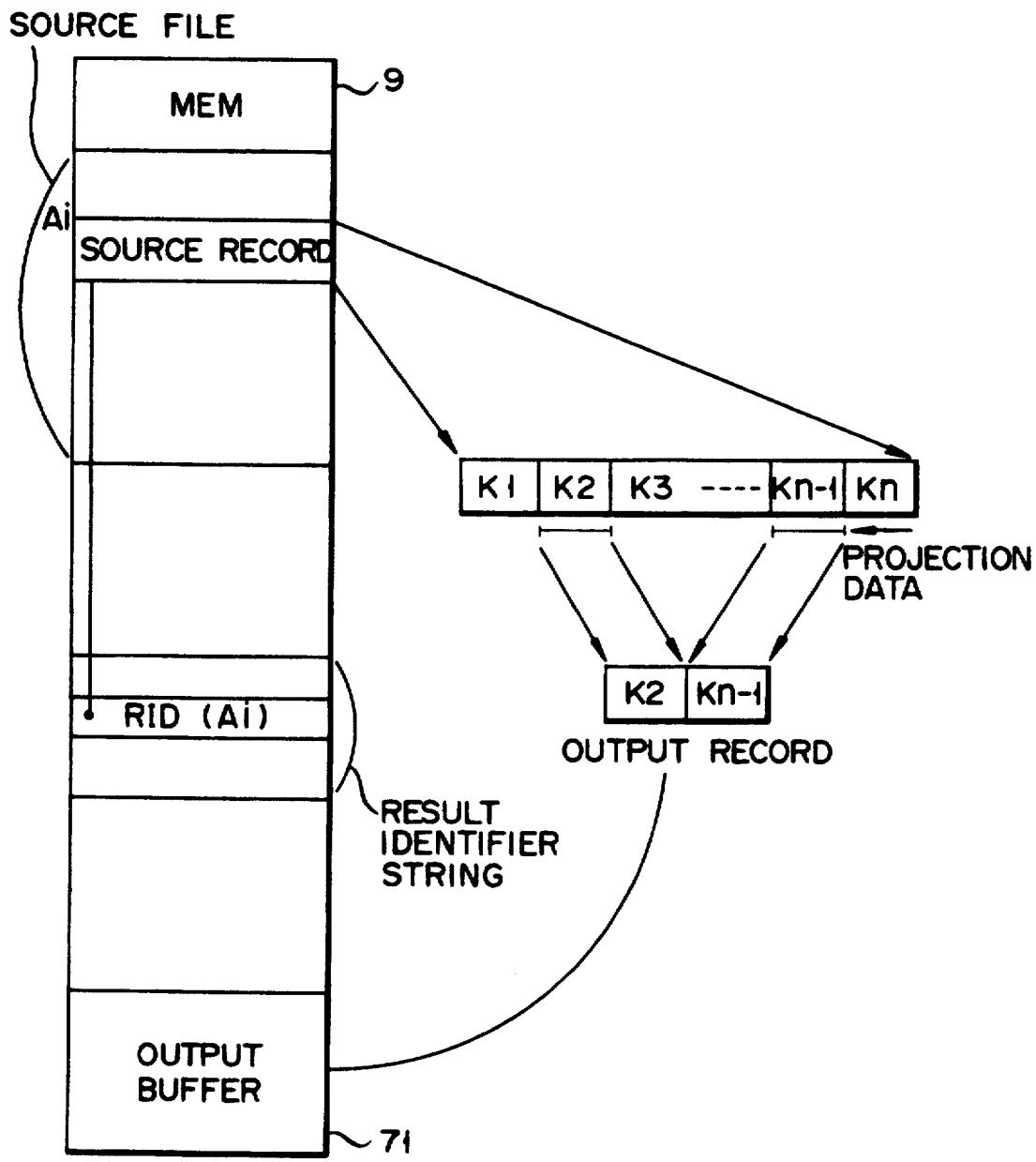

In rearrangement processing based on the result identifier string, when projection data for extracting some fields from the records of a file is designated as the parameters of a command by the CPU 1, fields (attributes) based on the projection data are extracted from the processing target records every time rearrangement based on a result identifier string is performed as shown in FIG. 10, and the extracted output data is stored in the output buffer 71 of the main memory 9, and then is stored in the magnetic disk unit 7 through the I/O channel 5.

As described above, in processing for obtaining an output file, since fields are extracted on the basis of projection data, overheads due to extraction processing for specific fields can be eliminated, and moreover the data amount of an output file to be actually output is decreased. Therefore, output processing can be performed at high speed.

According to another embodiment, a file forming function of forming a new file from an operation result and an extraction processing function of specific fields based on projection data may be added to the I/O channel 19 in addition to the local memory 23 as shown in FIG. 4, so that writing processing of an operation result in the main memory and transfer processing of operation result data from the main memory to an external storage are omitted, thus shortening the processing time, reducing the load factor of the system bus, and improving the processing performance.

In this case, when the CPU 1 recognizes that a result identifier string, as an operation result with respect to a source file, is stored in the second area of the main memory 9 under the control of the ROPU 11, the CPU 1 supplies the following data as parameters to the controller 21 of the I/O channel 19: the location data of the result identifier string in the main memory 9; logical data concerning the source file (source file data such as a file format, a block length, and a record length); logical data concerning an output file (output file data such as a file format, a block length, and a record length); and physical data (output file data such as a position on a disk and a size). In addition, if projection processing for extracting some fields (attributes) from the records of a file is to be performed, the CPU 1 supplies projection data for designating fields (attributes) to be extracted.

Upon reception of the respective data (parameters) from the CPU 1, the controller 21 of the I/O channel 19 reads out the records of the source file (target file) stored in the first area of the main memory 9, and stores the readout data in the output buffer of the local memory 23 in accordance with the logical data concerning the output file. When a predetermined amount of data is stored in the output buffer, the controller 21 writes the data in the magnetic disk unit 7 to be controlled in accordance with the physical data concerning the output file (output file data such as a location on the disk and a size).

In this rearrangement processing of the file based on the result identifier string, when projection data is set, the controller 21 extracts fields (attributes) based on the projection data from the records to be rearranged which are designated by the result identifier string as shown in FIG. 10, and stores data constituted by the extracted fields (attributes) in the output buffer of the local memory 23 to store the data in the magnetic disk unit 7 in units of predetermined amounts.

The controller 21 repeatedly executes the above-described operation with respect to result identifier strings corresponding to the location data of result identifier strings supplied from the CPU 1.

As described above, since the file forming function is provided to the I/O channel 19 having an output path to the magnetic disk unit 7 as an external storage, formation of an output file accompanying extraction of specific fields (attributes) can be efficiently executed at high speed. At the same time, since writing of operation result data in the main memory 9 and transfer of the data from the main memory 9 to the magnetic disk 7 can be omitted, the load factors of the CPU 1 and the system bus can be reduced, and the overall processing performance of the system can be greatly improved.

In the conventional technique, when projection processing is designated, only fields designated by the projection data are extracted from a source file to form an intermediate file, and an output file is formed from this intermediate file. In the present invention, however, since an output file is formed while projection processing is performed, overheads can be reduced as compared with the conventional technique.

The sixth embodiment of the present invention will be described below with reference to FIG. 11. In this embodiment, when the data amount of a processing target file exceeds the capacity of a main memory 9, extraction of key fields and processing of adding identifiers to the key fields are performed with respect to each element of the processing target file. Operation processing such as sorting and merge processing is performed with respect to a data string which comprises the pairs of all the identifiers and key fields of the processing target file, and which is obtained by repeating the above operation. In accordance with the obtained identifier string and the logical and physical data of the target file, a plurality of data blocks, including the records designated by the identifier string, are written in the main memory. The elements of a result file are formed from this data in the order of the records designated by the identifier string and are output to an external storage. This processing is performed with respect to all the identifiers of the result identifier string. Note that the same reference numerals in the sixth embodiment denote the same parts as in the above-described embodiments, and a description thereof will be omitted.

An operation of the sixth embodiment will be described below.

Figure 11:
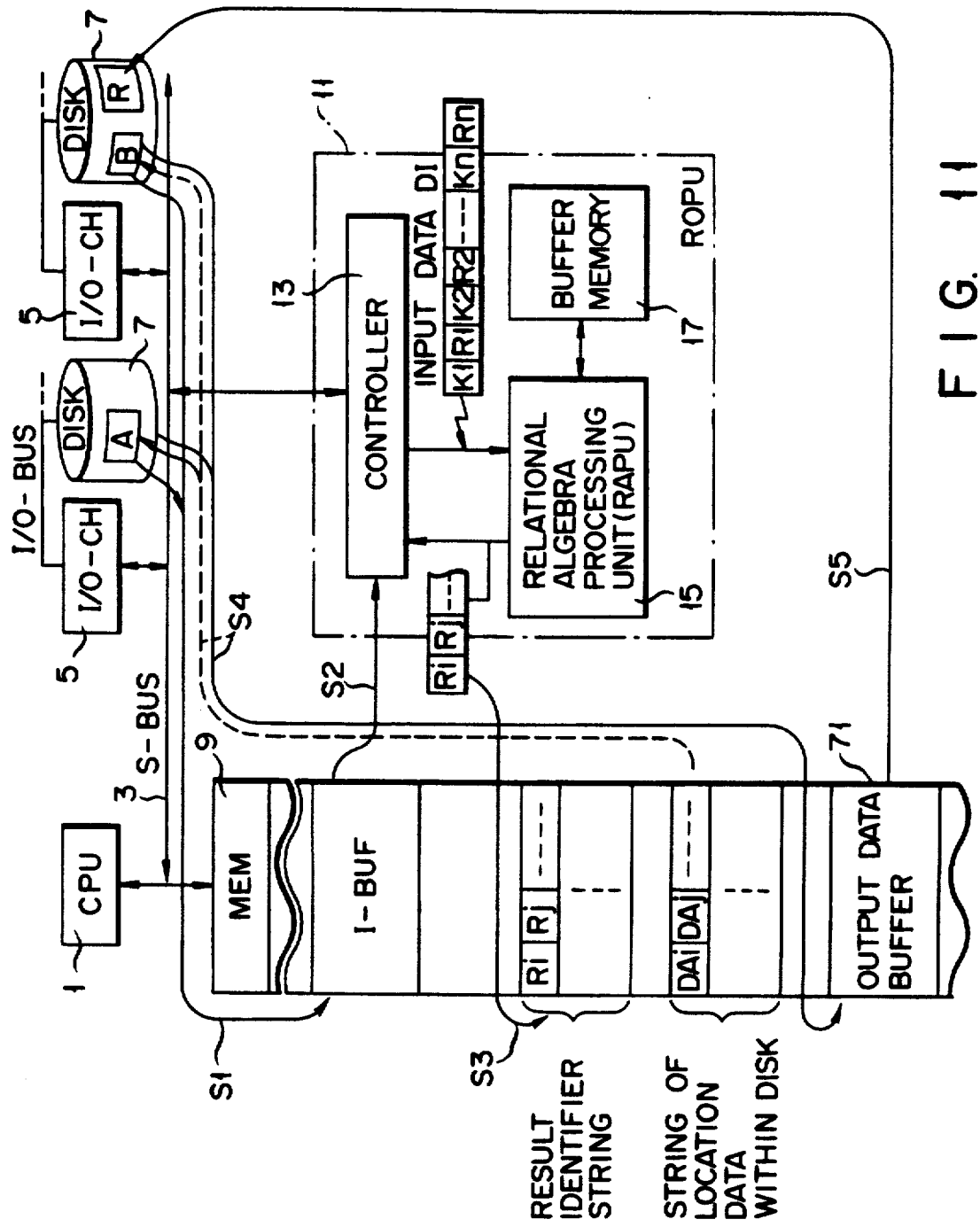
FIG. 11 is a block diagram showing the sixth embodiment of the present invention.

Upon reception of a processing target such as sorting or relational algebra and an operation command from an input mechanism on a terminal side (not shown) through a system bus 3, a CPU 1 reads out a processing target file from a magnetic disk unit 7 through an I/O channel 5, and writes the file in the first area of the main memory 9 (see S1 in FIG. 11).

In this case, if the processing target file exceeds the memory size of an input buffer (I-BUF), the file is divided into elements each having a data amount corresponding to the size of the I-BUF, and is fetched in the I-BUF. If the processing file is dispersed in a plurality of magnetic disk units 7 controlled by a plurality of I/O channels 5 connected to the system bus 3, the CPU 1 selectively designates an I/O channel and outputs an access command in accordance with the file format of the processing target file, thereby storing the data of the target file in the main memory 9 under the control of the designated I/O channel.

When the CPU 1 reads the processing target file or its elements in the first area constituting the I-BUF of the main memory 9 in the above-described manner, the CPU 1 supplies the following data and a start signal to an ROPU 11: data concerning the target file (file data including a file format, a block length, a record length, and the like); an operation command for the file; and location designation data on the main memory 9 for storing a result identifier string based on an operation result, partial output data consisting of a record string of the operation result, and the like.

Upon reception of the various data from the CPU 1, the ROPU 11 sets an operation mode of an RAPU 15 in response to the command, and executes sorting or relational algebra operation in a relation data base based on the command including key extraction processing.

More specifically, a controller 13 in the ROPU 11 extracts a designated key field Ki from each record of the file data stored in the first area constituting the I-BUF of the main memory 9, adds a serial number (record number) of the record having the key (within the file) as an identifier Ri to the key to generate input data (Di) consisting of a pair of the extracted key field Ki and the identifier Ri, and controls the RAPU 15 to write the data (Di) in the buffer memory 17 (see S2 in FIG. 11).

In this case, the controller 13 adds a flag representing whether the data is the key field Ki or the identifier Ri to each data in synchronism with data transfer to a buffer memory 17.

In this key extraction processing, if the processing target file cannot be stored in the I-BUF at once, and hence mode for fetching the file in the I-BUF in units of elements of the file is set, every time key field extraction processing is completed for the element held in the I-BUF, the next element to be processed is fetched in the I-BUF. Such key field extraction processing is repeated until processing of the entire target file is completed.

When writing of input data (DI) comprising a pair of an extracted key field Ki and an identifier Ri in the buffer memory 17 is executed by the above-described key field extraction processing with respect to all the target records of the processing target file, a data string comprising pairs of the key fields Ki and the identifiers Ri of the entire processing target file is formed in the buffer memory 17.

When the data string comprising the input data (DI) of the entire processing target file is arranged in the buffer memory 17, the controller 13 starts the RAPU 15.

The RAPU 15 sequentially reads the input data (DI) with the flags from the buffer memory 17, and executes an operation based on the operation command from the CPU 1 with respect to each extracted key field. The RAPU 15 sequentially extracts identifiers R1, R2, ... in the order of the obtained data string as the operation result, and outputs output data DO comprising the result identifier string to the controller 13.

The controller 13 stores the output data (DO) comprising the result identifier string supplied from the RAPU 15 in a predetermined second area of the main memory 9. When the operations for the entire processing target file are completed, and the result identifier string is arranged in the second area, the controller 13 signals the operation end to the CPU 1 (see S3 in FIG. 11).

Upon reception of the operation end signal from the controller 13, the CPU 1 obtains, in the second area of the main memory 9, an intra-disk location data string (DAi, DAj, ...) of the operation result records on the basis of the result identifier string (Ri, Rj, ...) and the logical and physical data of the processing target file. In addition, the CPU 1 obtains disk addresses including the storage locations of the operation result records on the basis of the intra-disk location data string (DAi, DAj, ...). In accordance with these addresses, the CPU 1 reads out the corresponding data from magnetic disk units 7, extracts the record data (operation result records) having the intra-disk location data as start locations, and stores the extracted data in a third area 71 constituting the predetermined output buffer of the main memory 9 in the order of the intra-disk location data string (DAi, DAj, ...) (see S4 in FIG. 11).

When the operation result record string stored in the third area 71 constituting an output buffer reaches a predetermined data amount determined by a buffer size, the CPU 1 controls a corresponding I/O channel 5 to store the operation result record string, which is stored in the third area, in an output file storage area (R) of a predetermined magnetic disk unit 7. As a result, partial output data comprising the operation result record string stored in the third area constituting the output buffer is stored in the output file storage area (R) of the magnetic disk unit 7 (see S5 in FIG. 11).

Such processing is repeatedly executed with respect to the intra-disk location data string (DAi, DAj, ...) for the entire processing target file.

By forming an output file based on a result identifier string in this manner, complex operation processing such as sorting or relational algebra operation in a relational data base can be efficiently executed at high speed with respect a large processing target file which cannot be stored in the main memory 9 at once without requiring partial operation and operation processing such as merge processing.

In the above embodiment, in response to the operation end signal from the controller 13 of the ROPU 11, the CPU 1 arranges the output file comprising the record string, which is arranged in the order of the operation result, in the output file storage area (R) of the magnetic disk unit 7 on the basis of the result identifier string (Ri, Rj, ...) stored in the second area of the main memory 9. However, if this processing function is provided to the I/O channel 5 or the ROPU 11, the load of the CPU 1 can be reduced.

The seventh embodiment of the present invention will be described below with reference to FIG. 12.

In the sixth embodiment shown in FIG. 11, operation result records are extracted from the magnetic disk units 7 in units of records on the basis of a result identifier string (Ri, Rj, . . .), and are stored in the output buffer 71 of the main memory 9.

In the seventh embodiment, the distribution state of target records is checked from an intra-disk location data string (DAi, DAj, . . .), and an efficient data input unit including one or a plurality of records is determined. Data is extracted from the magnetic disk unit 7 in accordance with this input unit to obtain an operation result record string. With this operation, the frequency of access to the magnetic disk unit 7 can be reduced as compared with the first embodiment, and hence the processing time is shortened.

Figure 12:
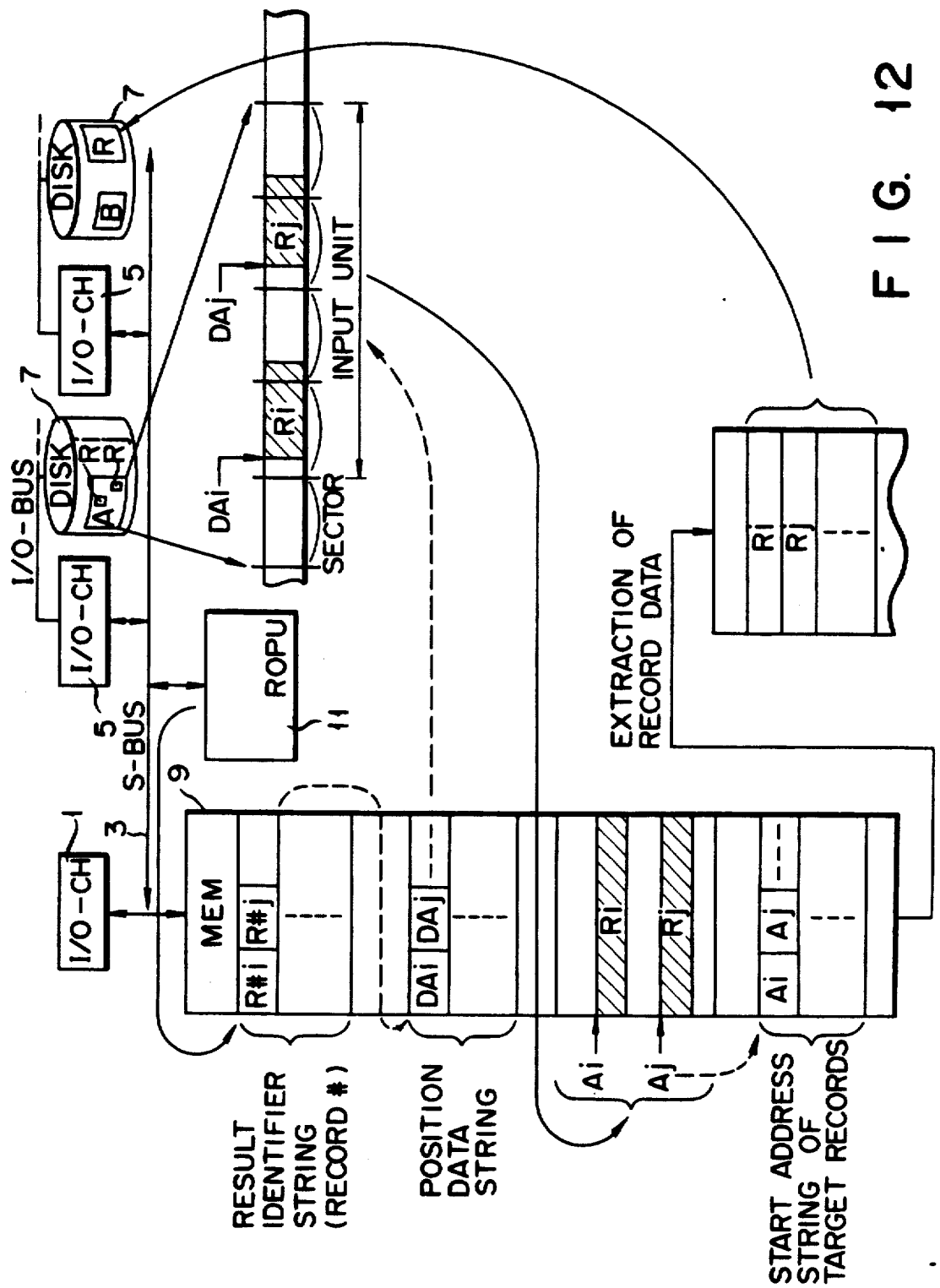
FIG. 12 is a block diagram showing the seventh embodiment of the present invention.

Referring to FIG. 12, an intra-disk location data string (DAi, DAj, . . .) is obtained from a result identifier string (Ri, Rj, . . .) for the entire processing target file in the same manner as in the sixth embodiment in FIG. 11.

In the seventh embodiment, as shown in FIG. 12, a CPU 1 checks the distribution state of target records on the magnetic disk units 7 by referring to an intra-disk location data string (DAi, DAj, . . .), and determines an efficient data input unit (the sector length of data to be read with one access). The CPU 1 reads data from the magnetic disk units 7 in accordance with this input unit and stores the data in a specific area of a main memory 9. At the same time, the CPU 1 generates the start address string of the respective records in the main memory 9. The CPU 1 extracts the target records based on operation results from the third area of the main memory 9 and the start address string of the target records, and stores them in the fourth area constituting the output buffer of the main memory 9 in the order of the operation results. Partial output data consisting of the record string, based on the operation results, is stored in an output file storage area (R) of the magnetic disk unit 7 in units of output buffer sizes.

Such processing is repeatedly executed with respect to the intra-disk location data string (DAi, DAj, . . .) for the entire processing target file.

By forming an output file based on a result identifier string in this manner, complex operation processing such as sorting or relational algebra operation in a relational data base can be efficiently executed at high speed with respect a large processing target file which cannot be stored in the main memory at once while the access frequency to the magnetic disk unit 7 is suppressed.

Similarly, in the seventh embodiment, if part or all of the processing function of arranging an output file from a result identifier string (Ri, Rj, . . .) is provided to the I/O channel 5 or the ROPU 11, the load of the CPU 1 can be reduced.

In the above-described embodiments, designated data is extracted from each record of a processing target file, and a serial number of the record having the key field (in the file) is added as an identifier to the key field, thus obtaining input data (DI) consisting of a pair of the key field and the identifier. However, an identifier is not limited to a serial number in a processing target file, but any data by which the location of a target record on an external storage can be identified can be used as an identifier.

In addition, the input buffer (first area) of the main memory 9 may be constituted by a double buffer so that fetching of data from the magnetic disk units 7 and key field extraction processing can be simultaneously performed.

What is claimed is:

1. A data processing apparatus comprising:
    external storage means for storing files comprising records having a plurality of data fields which are each assignable as a key field;
    main memory means for storing, in a first area, a processing target file selected from the files stored in said external storage means, the processing target file including a plurality of records;
    an input/output device, coupled to said external storage means and said main memory means, for reading the processing target file from said external storage means, for storing the read file in said main memory means, and for writing a file stored in said main memory means into said external storage means;
    a central processing unit (CPU), coupled to said main memory means, for outputting data regarding the processing target file, an operation command for designating an operation for the target processing file, and address data of a second area of said main memory means which stores, as an operation result, a plurality of identifiers representing addresses at which each of the plurality of records contained in the target processing file is stored; and
    a relational operating device, coupled to said main memory means and to said CPU and receiving the outputted data and operation command, comprising:
    key field extracting means for extracting a key field from each of the plurality of records of the processing target file in response to the operation command supplied from said CPU;
    adding means, coupled to the key field extracting means, for adding one of the plurality of identifiers to the extracted key field;
    operation performing means, coupled to the adding means, for performing an operation designated by the operation command using the extracted key field and the added identifier as a processing unit and for obtaining a data string as the operation result;

identifier extracting means, coupled to the operation performing means, for extracting each added identifier from the data string obtained as the operation result; and storing means, coupled to the identifier extracting means, for storing the extracted identifiers in the second area of said main memory means, said CPU rearranging the respective records stored in the first area of said main memory means in the order of the extracted identifiers stored in the second area of said main memory means.

2. A data base processing apparatus comprising:

external storage means, for storing files comprising a plurality of records each having a plurality of data fields which are assignable as a key field;

main memory means for storing, in a first area, a processing target file selected from the files stored in said external storage means, the processing target file including a plurality of records;

an input/output device, coupled to the external storage means and said main memory means, for reading the processing target file from said external storage means, for storing the read file in said main memory means, and for writing a file stored in said main memory means into said external storage means, said input/output device comprising local memory means and output file performing means for rearranging the records stored in the first area of said main memory means;

a central processing unit (CPU), coupled to said main memory means, for outputting data regarding the processing target file, an operation command for designating an operation for the target processing file, and address data of a second area of said main memory means which stores, as an operation result, a plurality of identifiers representing addresses at which each of the plurality of records contained in the target processing file is stored; and a relational operating device, coupled to said main memory means and to said CPU and receiving the outputted data and operation command, comprising:

key field extracting means for extracting a key field from each of the plurality of records of the processing target file in response to the operation command supplied from said CPU;

adding means, coupled to the key field extracting means, for adding one of the plurality of identifiers to the extracted key field;

performing means, coupled to the adding means, for performing an operation designated by the operation command using the extracted key field and the added identifier as a processing unit and for obtaining a data string as the operation result; and identifier extracting means, coupled to the operation performing means, for extracting each identifier from the data string obtained as the operation result, and for storing the extracted identifiers in the second area of said main memory means, said input/output device rearranging the records stored in the first area of said main memory means in the order of the extracted identifiers stored in the second area of said main memory means, and writing the rearranged records as an output file to said external storage means.

3. An apparatus according to claim 2, wherein said CPU supplies to said input/output device the address data of the plurality of identifiers stored in the second area of said main memory means, logical data of the processing target file including a file format, a block length, and a record length, logical data of the output file including a file format, a block length, and a record length, and physical data including a size and a position of said external storage means.

4. A data base processing apparatus comprising:

a host unit;

an input/output channel connected to said host unit through a first system bus;

a disk controller, connected to said input/output channel through a second system bus, for controlling a plurality of disk units; and a data base processing mechanism, connected with said disk controller through the second system bus and having a local memory, said data base processing mechanism including:

receiving means for receiving an operation processing command and parameters with respect to a data base, including a sorting or relational algebra operation in a relational data base from said host unit through said input/output channel, for obtaining control of the second system bus, for reading a processing target file having a plurality of records from one of said plurality of disk units through said disk controller, and for storing the read file in a first area of said local memory;

adding means, coupled to the receiving means, for extracting a key field from each record of the processing target file, and for adding start address data to each extracted key field as an identifier;

performing means, coupled to the receiving means, for performing an operation based on the operation processing command, using the extracted key field and the added identifier as input data, for sequentially extracting each added identifier from a data string obtained as an operation result, and for storing each extracted identifier in a second area of said local memory;

rearranging means, coupled to the operation performing means, for rearranging the records stored in the first area of said local memory in the order of the extracted identifiers stored in the second area of said local memory to obtain a processed file;

storing means, coupled to said rearranging means, for storing the processed file obtained by said rearranging means in one of said disk units; and signaling means, coupled to the storing means, for signaling an end of operation processing to said host unit.

5. A data base processing apparatus comprising:

external storage means for storing files comprising records each having a plurality of data fields which are each assignable as a key field;

main memory means for storing in a first area a processing target file selected from the files stored in said external storage means;

an input/output device, coupled to said external storage means and said memory means, for reading the processing target file from said external storage means, for storing the read file in said main memory means, and for writing a file stored in said main memory means into said external storage means;

a central processing unit (CPU), coupled to said main memory means, for outputting data regarding the processing target file, an operation command for designating an operation for the target processing file, and address data of a second area of said main memory in which an operation result is to be stored; and a relational operating device, coupled to said main memory means and to said CPU and receiving the outputted data and operation command, comprising:

key field extracting means for extracting a key field from each of the plurality of records of the processing target file stored in the first area of said main memory means in response to the operation command supplied from said CPU;

adding means, coupled to the key field extracting means, for adding one of a plurality of identifiers to each extracted key field;

operation performing means, coupled to said adding means, for performing an operation designated by the operation command using the extracted key field and the added identifier as a processing unit and for obtaining an operation result;

identifier extracting means, coupled to said operation performing means, for extracting each added identifier from the operation result;

generating means, coupled to said identifier extracting means, for generating one of a result identifier string and a data string comprising pairs of extracted identifiers and key fields, said data string being generated when an amount of data in the processing target file exceeds a predetermined amount; and writing means, coupled to the generating means, for writing one of the result identifier string and the data string in the second area of said main memory means;

the CPU including rearranging means, coupled to the writing means, for rearranging the records stored in the first area in the order of the extracted identifiers when the result identifier string is stored in the second area; and holding means, coupled to the rearranging means, for holding the data string as an intermediate result of operation processing with respect to the processing target file and for rearranging the records stored in the first area of said main memory using the intermediate result when the data string is generated and stored in the second area.

6. An apparatus according to claim 5, wherein when the operation result stored in the second area of said main memory means is a data string comprising pairs of identifiers and key fields, said CPU uses the data string to perform merge processing.

7. A data base processing apparatus comprising:

external storage means for storing files comprising records having a plurality of data fields each assignable as a key field;

local memory means having a first area in which a processing target file selected from the files stored in said external storage means is stored, the processing target file including a plurality of records;

a central processing unit (CPU), coupled to said local memory means, for outputting data regarding the processing target file, an operation command for designating an operation for the target processing file, and address data of a second area of said local memory means at which each of the plurality of records contained in the processing target file is stored; and a relational operating device, coupled to said local memory means and to said CPU and receiving the outputted data and operation command, comprising:

key field extracting means for extracting a key field from each of the plurality of records of processing target file in response to the operation command supplied from said CPU;

adding means, coupled to the key field extracting means, for adding one of the identifiers to each extracted key field;

operation performing means, coupled to the adding means, for performing an operation designated by the operation command using each extracted key field and added identifier as a processing unit and for obtaining a first data string as an operation result;

identifier extracting means, coupled to the operation performing means, for extracting each added identifier from the first data string obtained as the operation result;

the data base processing apparatus further comprising generating means, coupled to the identifier extracting means, for generating one of a result identifier string and a second data string comprising pairs of identifiers and key fields, said second data string being generated when an amount of data in the processing target file exceeds a predetermined amount;

the relational operating device further comprising writing means, coupled to the generating means, for writing one of the result identifier string and the second data string in the second area of said local memory means;

the CPU including rearranging means, coupled to the writing means, for rearranging the records stored in the first area of said local memory means in the order of the identifiers when the result identifier string is written in the second area; and holding means, coupled to the rearranging means, for holding the second data string when the second data string is written in the second area as an intermediate result of operation processing for the processing target file and for rearranging the records stored in the first area of said local memory means using the intermediate result.

8. An apparatus according to claim 5, wherein said relational operating device additionally comprises:

first and second buffers, coupled to the identifier extracting means, for storing the result identifier and the data string comprising pairs of identifiers and key fields;

an operating unit, coupled to the first and second buffers, for comparing the key field data read out from said first and second buffers;

a mode register, coupled to the operating unit, for holding a type of designated operation; and selector means, coupled to the mode register, for selectively outputting one of the result identifier string and the data string read out from one of said first and second buffers based on the type of designated operation set in said mode register on a comparison result from said operating unit.

9. An apparatus according to claim 6, wherein said relational operating means comprises:
first and second buffers, coupled to the identifier extracting means, for storing the result identifier and the data string comprising pairs of identifiers and key fields;
an operating unit, coupled to the first and second buffers, for comparing the key field data read out from said first and second buffers;
a mode register, coupled to the operating unit, for holding a type of designated operation; and
selector means, coupled to the mode register, for selectively outputting one of the result identifier string and the data string read out from one of said first and second buffers based on the type of designated operation set in said mode register and on a comparison result from said operating unit.

10. A data base processing apparatus comprising:
external storage means for storing files comprising records having a plurality of data fields which are each assignable as a key field;
main memory means for storing in a first area a processing target file selected from the files stored in said external storage means, the processing target file including a plurality of records;
an input/output device, coupled to said external storage means and said main memory means, for reading the processing target file from said external storage means, for storing the read file in said memory means, and for writing a file stored in said main memory means into said external storage means;
a central processing unit (CPU), coupled to said main memory means, for outputting data regarding the processing target file, an operation command for designating an operation for the target processing file, and address data of a second area of said main memory in which an operation result is to be stored; and
a relational operating device, coupled to said main memory means and to said CPU and receiving the outputted data and operation command, comprising:
first key field extracting means for extracting a key field from each of the plurality of records of the processing target file in response to the operation command supplied from said CPU;
adding means, coupled to the key field extracting means, for adding one of a plurality of identifiers to each extracted key field;
operation performing means, coupled to the adding means, for performing an operation designated by the operation command using each extracted key field and added identifier as a processing unit and for obtaining a data string as an operation result;
identifier extracting means, coupled to the operation performing means, for extracting each added identifier from the data string obtained as the operation result;
generating means, coupled to the identifier extracting means, for generating a result identifier string, and for writing the result identifier string in the second area of said main memory means;
rearranging means, coupled to the generating means, for rearranging the records stored in the first area in the order of the extracted identifiers stored in the second area, and at the same time for extracting a partial field of the records in response to projection data; and
second key field extracting means, coupled to the rearranging means, for extracting key fields designated by the projection data and for writing the extracted key fields designated by the projection data in said external storage means each time the records are rearranged.

11. A data base processing apparatus, comprising:
external storage means for storing files comprising records having a plurality of data fields which are each assignable as a key field;
local memory means having a first area in which a processing target file selected from the files stored in said external storage means is stored, the processing target file including a plurality of records;
a central processing unit (CPU), coupled to said local memory means, for outputting data regarding the processing target file, an operation command for designating an operation for the target processing file, and address data of a second area of said local memory means, which stores identifiers representing addresses at which each of the plurality of records contained in the processing target file is stored; and
a relational operating device, coupled to said local memory means and to said CPU and receiving the outputted data and operation command, comprising:
key field extracting means for extracting a key field from each of the plurality of records of the processing target file in response to the operation command supplied from said CPU;
adding means, coupled to the key field extracting means, for adding one of the identifiers to each extracted key field;
operation performing means, coupled to the adding means, for performing the operation designated by the operation command using each extracted key field and added identifier as a processing unit and for obtaining a first data string as an operation result;
identifier extracting means, coupled to the operation performing means, for extracting each added identifier from the first data string obtained as the operation result;
generating means, coupled to the identifier extracting means, for generating one of a result identifier string and a second data string, comprising pairs of identifiers and key fields said second data string being generated when an amount of data in the processing target file exceeds a predetermined amount;
writing means, coupled to the generating means, for writing one of the result identifier string and the second data string into the second area of said local memory means;
rearranging means, coupled to the writing means, for rearranging the records stored in the first area of said local memory means in the order of the identifiers when the result identifier string is written in the second area and, at the same time, in response to projection data, for extracting a partial field of each of the records, for extracting key fields designated by the projection data, and for writing the extracted key fields in said external storage means each time the records are rearranged; and holding means, coupled to the rearranging means, for holding the second data string, when the second data string is written in the second area, as an intermediate result of operation processing for the processing target file and for rearranging the records stored in the first area of said local memory means using the intermediate result.

12. A data base processing apparatus, comprising:

external storage means for storing files comprising a plurality of data fields which are each assignable as key field;

main memory means for storing, in a first area, a processing target file selected from the files stored in said external storage means, the processing target file including a plurality of records;

an input/output device, coupled to said external storage means and said main memory means, for reading the processing target file from said external storage means, for storing the read file in said main memory means, and for writing a file stored in said main memory means into said external storage means;

a central processing unit (CPU), coupled to said main memory means, for outputting data regarding the processing target file, an operation command for designation an operation for the target processing file, and address data of a second area of said main memory in which an operation result is to be stored;

a relational operating device, coupled to said main memory means and to said CPU and receiving the outputted data and operation command, comprising:

key field extracting means for extracting a key field from each of the plurality of records of the processing target file in response to the operation command supplied from said CPU;

adding means, coupled to the key field extracting means, for adding one of a plurality of identifiers as a number or as relative position data of each record, to each extracted key field;

operation performing means, coupled to the adding means, for performing an operation designated by the operation command using each extracted key field and added identifier as a processing unit and for obtaining a data string as an operation result;

identifier extracting means, coupled to the operation performing means, for extracting each of the added identifiers from the data string obtained as the operation result;

generating means, coupled to the identifier extracting means, for generating a result identifier string; and writing means, coupled to the generating means, for writing the result identifier string in the second area of said main memory means;

obtaining data position means, coupled to the relational operating device, for obtaining a position data string comprising operation result records from the result identifier string and physical data of the processing target file, the physical data including external storage addresses; and means, coupled to the obtaining data position means, for fetching records from said external storage means into a third area of said main memory means by accessing said external storage means based on the position data string, and for storing the fetched records in an output file storage area of said external storage means in units of predetermined amounts.

13. A data base processing apparatus for executing predetermined operation processing for a data base, including sorting and relational algebra processing in a relational data base, with respect to a processing target file located in at least one external storage unit and having an amount of data, the apparatus comprising:

dividing means for dividing the processing target file into a plurality of partial elements when the amount of data of the processing target file exceeds an amount of data which can be processed at once in a main memory means, and for fetching the file to a first area of said main memory means as units of partial elements;

receiving means, coupled to the dividing means, for receiving logical data concerning the processing target file including a block length, a record length, a key position, a key length, and an operation command including an operation type;

key extracting means, coupled to the receiving means, for extracting a key to be processed from each record of the processing target file in accordance with the logical data;

adding means, coupled to the key extracting means, for adding one of a serial number and relative position data of each record to each extracted key;

executing processing means, coupled to the receiving means, for executing processing with respect to the processing target file, to obtain input data comprising a pair including an extracted key and an identifier, for executing an operation based on the operation command with respect to a key value of the obtained input data, and for storing an identifier string rearranged in the order of operation results, in a second area of said main memory means;

position data obtaining means, coupled to the executing processing means, for obtaining a position data string of the operation results from the identifier string, stored in the second area of said main memory means, and logical and physical data of the processing target file;

determining means, coupled to the position data obtaining means, for determining an input unit of external storage data including at least one record to be processed from the position data string, and for reading data of each input unit from said external storage means in the order of the position data string into a third area of said main memory means;

start address obtaining means, coupled to the determining means, for obtaining a start address of each record of the data in the third area of said main memory means in the order of the identifier string;

record data extracting means, coupled to the start address obtaining means, for extracting the record data from the third area of said main memory means in the order of the address string, and for arranging output data in a fourth area of said main memory means as a result file including physical data representing external storage addresses; and outputting means, coupled to the extracting means, for outputting the output data in the fourth area of said main memory means to an output file storage area of a predetermined external storage in accordance with the physical data of the result file.

* * * * *

UNITED STATES PATENT AND TRADEMARK OFFICE
CERTIFICATE OF CORRECTION

PATENT NO. : 5,247,665
DATED : September 21, 1993
INVENTOR(S) : Susumu Matsuda et al.

It is certified that error appears in the above-indentified patent and that said Letters Patent is hereby corrected as shown below:

On the title page, column 1, second line of inventors, after "Takao Iwasaki", insert --Oome; Kazunori Shimakawa, Oome, all of Japan--.

Claim 12, column 29, line 26, change "designation" to --designating--.

Signed and Sealed this

Twenty-first Day of June, 1994

Attest:

BRUCE LEHMAN

*Attesting Officer*   *Commissioner of Patents and Trademarks*